(12) United States Patent
Takaoka et al.

(10) Patent No.: US 8,909,002 B2
(45) Date of Patent: Dec. 9, 2014

(54) LIGHT MODULATOR, OPTICAL PICKUP, AND LIGHT MODULATION MODULE

(71) Applicant: Panasonic Corporation, Osaka (JP)

(72) Inventors: Tatsuya Takaoka, Osaka (JP); Kousei Sano, Osaka (JP); Hidenori Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/123,156

(22) PCT Filed: Mar. 28, 2013

(86) PCT No.: PCT/JP2013/002106
§ 371 (c)(1),
(2), (4) Date: Nov. 29, 2013

(87) PCT Pub. No.: WO2013/150748
PCT Pub. Date: Oct. 10, 2013

(65) Prior Publication Data
US 2014/0099052 A1    Apr. 10, 2014

(30) Foreign Application Priority Data

Apr. 5, 2012   (JP) .................................. 2012-086121

(51) Int. Cl.
*G02F 1/035*  (2006.01)
*G02F 1/01*  (2006.01)
*G02F 1/025*  (2006.01)
*G11B 7/128*  (2012.01)

(52) U.S. Cl.
CPC ................ *G02F 1/011* (2013.01); *G02F 1/025* (2013.01); *G11B 7/128* (2013.01); *G02F 2203/10* (2013.01)
USPC ....................................... 385/3; 385/1; 385/2

(58) Field of Classification Search
CPC ....... G02F 1/0134; G02F 1/011; G02F 1/025; G11B 7/128
USPC .......................................................... 385/1–3
See application file for complete search history.

(56) References Cited

U.S. PATENT DOCUMENTS

| | | | |
|---|---|---|---|
| 5,067,788 A | 11/1991 | Jannson et al. | |
| 6,885,781 B2* | 4/2005 | Glebov et al. | 385/8 |
| 8,107,325 B2* | 1/2012 | Komura et al. | 369/13.33 |

(Continued)

FOREIGN PATENT DOCUMENTS

| | | |
|---|---|---|
| JP | 5-313108 | 11/1993 |
| JP | 2008-112151 | 5/2008 |

OTHER PUBLICATIONS

International Search Report issued Jul. 2, 2013 in International (PCT) Application No. PCT/JP2013/002106.

(Continued)

*Primary Examiner* — Ryan Lepisto
(74) *Attorney, Agent, or Firm* — Wenderoth, Lind & Ponack, L.L.P.

(57) ABSTRACT

A light modulator (101) includes a waveguide (112) through which guided light propagates, a metal layer (113) formed adjacent to the waveguide (112), a conductive oxide layer (114) having electrical conductivity and formed on a surface of the metal layer (113) which is not adjacent to the waveguide (112), an insulating layer (115) formed adjacent to the conductive oxide layer (114), and a modulation circuit (102) that applies a voltage between the metal layer (113) and one of the conductive oxide layer (114) and the insulating layer (115). An interface (11) at which the conductive oxide layer (114) and the insulating layer (115) are adjacent to each other is formed at a distance shorter than a wavelength of the guided light in vacuum, from the surface of the metal layer (113) which is not adjacent to the waveguide (112).

11 Claims, 19 Drawing Sheets

(56) References Cited

U.S. PATENT DOCUMENTS

| | | | |
|---|---|---|---|
| 2002/0118902 A1* | 8/2002 | Kambe | 385/2 |
| 2003/0133638 A1* | 7/2003 | Jin et al. | 385/2 |
| 2005/0128886 A1* | 6/2005 | Ogawa et al. | 369/13.33 |
| 2008/0084597 A1 | 4/2008 | Hamada | |
| 2009/0238511 A1* | 9/2009 | Quitoriano et al. | 385/2 |
| 2010/0103495 A1 | 4/2010 | Kuang | |
| 2010/0215309 A1* | 8/2010 | Shubin et al. | 385/3 |
| 2011/0002575 A1* | 1/2011 | Kato | 385/3 |
| 2012/0257850 A1* | 10/2012 | Fujikata et al. | 385/3 |

OTHER PUBLICATIONS

A. Melikyan et al., "Surface Plasmon polariton absorption modulator", Optics Express, Apr. 25, 2011, vol. 19, No. 9, pp. 8855-8869.

Eyal Feigenbaum et al., "Unity-Order Index Change in Transparent Conducting Oxides at Visible Frequencies", Nano Letters, Oct. 2011, pp. 2111-2116.

C. Jung et al., "Electro-optic polymer light modulator based on surface plasmon resonance", Applied Optics, Feb. 20, 1995, vol. 34, No. 6, pp. 946-949.

* cited by examiner

LIGHT MODULATOR, OPTICAL PICKUP, AND LIGHT MODULATION MODULE

TECHNICAL FIELD

The present invention relates to a light modulator that modulates light, an optical pickup including the light modulator, and a light modulation module including the light modulator.

BACKGROUND ART

Light modulation schemes used for optical recording or optical communication include a direct modulation scheme for modulating a driving current to directly modulate a light source and an indirect modulation scheme for modulating light from a light source that emits a constant amount of light, using a separately provided light modulator.

The direct modulation scheme is limited in its ability to increase modulation speed due to the presence of a threshold current and a capacitance in the light source. Thus, with an increased transfer rate for an optical pickup or optical communication, an indirect modulation scheme has been demanded which enables an increase in modulation speed.

Light modulators based on the indirect modulation scheme expected to achieve high-speed modulation include a phase modulation type that carries out intensity modulation by interference of light with a phase thereof modulated utilizing electro-optic crystals such as $LiNbO_3$ or KTP and a plasmon coupling type that modulates the amount of transmitted light utilizing coupling between surface plasmon polariton (hereinafter simply referred to SPP) and guided light.

The phase modulation type has widely prevailed as a light modulator for optical communication. However, the electro-optic effect changes refractive index only by a small amount, and therefore an electric field needs to be applied over an optical path of several mm in order to obtain sufficient phase modulation. Thus, miniaturizing modulators of the phase modulation type is difficult. Furthermore, disadvantageously, an electrode for applying an electric field is large in size and thus involves a large parasitic capacitance, hindering high-speed modulation.

The plasmon coupling type includes a light modulator that modulates transmitted light utilizing coupling between SPP localized at an interface between metal and an electro-optic polymer and guided light propagating through a waveguide (see, for example, Patent Literature 1). This light modulator applies an electric field to the electro-optic polymer to manipulate SPP excitation conditions and modulates the transmitted light based on the intensity of the coupling between the guided light and the SPP.

FIG. 30 is a cross-sectional view of a conventional plasmon modulator described in Patent Literature 1.

A plasmon modulator 801 includes a waveguide section and a plasmon excitation section disposed adjacent to the waveguide section. The waveguide section includes a waveguide 802 sandwiched between two coating materials 803. Furthermore, the plasmon excitation section includes a photoelectric material 806 sandwiched between two metal electrodes 805a and 805b. Patent Literature 1 introduces an electro-optic polymer as the photoelectric material 806. The waveguide section and the plasmon excitation section are disposed adjacent to each other via a buffer layer 804.

Guided light propagating through the waveguide 802 and SPP localized at an interface between the metal material 805a and the photoelectric material 806 are present in the plasmon modulator 801. The energy of the guided light couples to and is absorbed by the SPP when a phase matching condition between the guided light and the SPP is met. The wavenumber of the SPP depends on the refractive index of an area around the interface. Thus, by applying an electric field to the photoelectric material 806 to change the refractive index of the photoelectric material 806 based on the electro-optic effect, the plasmon modulator 801 can control the wavenumber of the SPP and thus the degree of coupling between the SPP and the guided light. By controlling the amount of attenuation of the guided light caused by the coupling to the SPP, the plasmon modulator 801 can modulate the intensity of output light transmitted through the plasmon modulator 801.

Furthermore, Patent Literature 2 proposes that a two-dimensional periodic structure be formed in the metal electrode. This allows the use of an electro-optic crystal such as $LiNbO_3$ or KTP which exerts a significant electro-optic effect and which has been unable to be utilized for the structure in Patent Literature 1 due to the high refractive index of the electro-optic crystal.

However, the amount of change in refractive index achieved by the electro-optic effect of the electro-optic polymer is very small, about 0.001, when an electric field of 30 V/um is applied. Thus, a change in the phase matching condition between the guided light and the SPP depending on the presence or absence of an applied electric field is small, and a difference in the amount of attenuation of the guided light resulting from the coupling to the SPP is small. In the conventional art, due to the small difference in the amount of attenuation of the guided light depending on whether or not an applied electric field is present, the degree of modulation of modulated light is disadvantageously low. Furthermore, the degree of modulation can be improved by increasing the length of the modulator, but in this case, the modulator disadvantageously has an increased insertion loss.

Furthermore, even a structure using $LiNbO_3$ or KTP as proposed in Patent Literature 2 involves a small change in refractive index. For example, when $LiNbO_3$ is used, a change in refractive index caused by the electro-optic effect is about 0.0016 in amount when an electric field of 10 V/um, which is a dielectric breakdown field for the $LiNbO_3$ crystal, is applied. Thus, the modulator in Patent Literature 2 involves only a small change in the phase matching condition between the guided light and the SPP, failing to change the degree of coupling between the guided light and the SPP. The modulator in Patent Literature 2 disadvantageously has difficulty in achieving a high degree of modulation.

CITATION LIST

Patent Literature

Patent Literature 1: Japanese Patent Application Laid-open No. H5-313108

Patent Literature 2: Japanese Patent Application Laid-open No. 2008-112151

SUMMARY OF THE INVENTION

The present invention has been developed in order to solve the problems described above. An object of the present invention is to provide a light modulator, an optical pickup, and a light modulation module which can achieve an increased degree of modulation and a high modulation speed even when the light modulator is small in length.

A light modulator according to an aspect of the present invention includes a waveguide through which guided light propagates, a metal layer formed adjacent to the waveguide, a conductive oxide layer having electrical conductivity and formed on a surface of the metal layer which is not adjacent to the waveguide, an insulating layer formed adjacent to the conductive oxide layer, and a modulation circuit that applies a voltage between the metal layer and one of the conductive oxide layer and the insulating layer. An interface at which the conductive oxide layer and the insulating layer are adjacent to each other is formed at a distance shorter than a wavelength of the guided light in vacuum, from the surface of the metal layer which is not adjacent to the waveguide.

According to this configuration, the interface at which the conductive oxide layer and the insulating layer are adjacent to each other is formed at the distance shorter than the wavelength of the guided light in vacuum, from the surface of the metal layer which is not adjacent to the waveguide.

According to the present invention, when a voltage is applied to the metal layer, the conductive oxide layer, and the insulating layer, the electron density of the conductive oxide layer near the interface between the conductive oxide layer and the insulating layer changes to cause a significant change in the refractive index of the conductive oxide layer near the interface. Consequently, a phase matching condition between the guided light and SPP changes significantly depending on whether or not an applied voltage is present. This increases a difference in the amount of attenuation of the guided light caused by coupling to the SPP depending on whether or not an applied voltage is present. Because of the great difference in the amount of attenuation of the guided light depending on whether or not an applied voltage is present, an increased degree of modulation and a high modulation speed can be achieved even when the light modulator is small in length.

Objects, features, and advantages of the present invention will be apparent from the detailed description below and the attached drawings.

DESCRIPTION OF EMBODIMENTS

Embodiments of the present invention will be described below with reference to the drawings. The embodiments described below are examples in which the preen invention is embodied, and do not limit the technical scope of the present invention.

Embodiment 1

Figure 1:
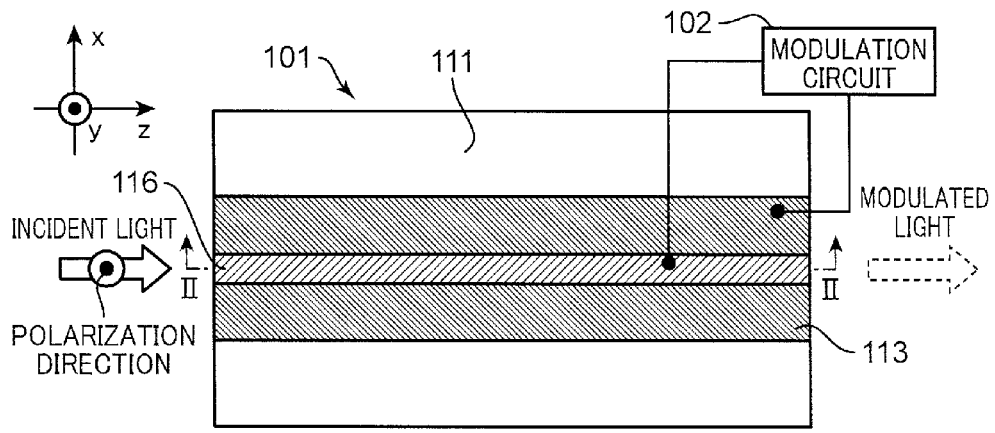
FIG. 1 is a top view of a light modulator according to Embodiment 1 of the present invention.
Figure 2:
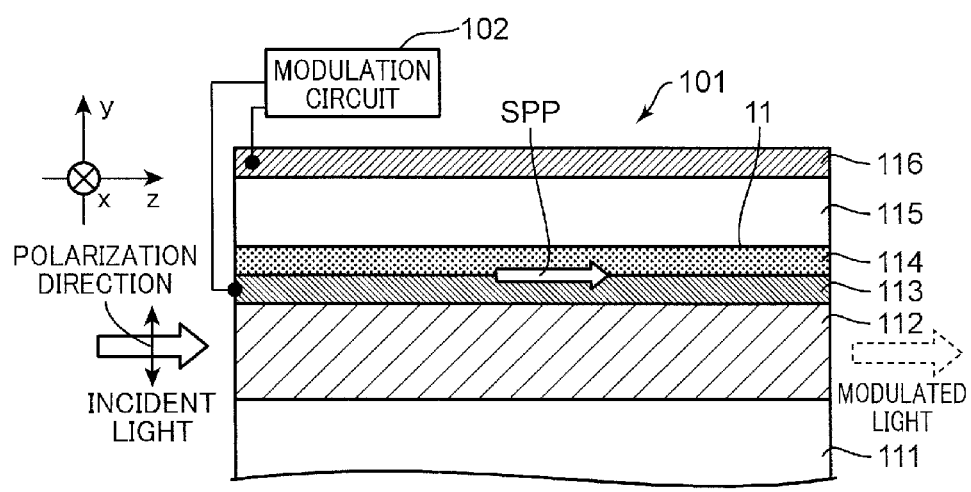
FIG. 2 is a cross-sectional view of the light modulator shown in FIG. 1, the view being taken along line II-II in FIG. 1.
Figure 3:
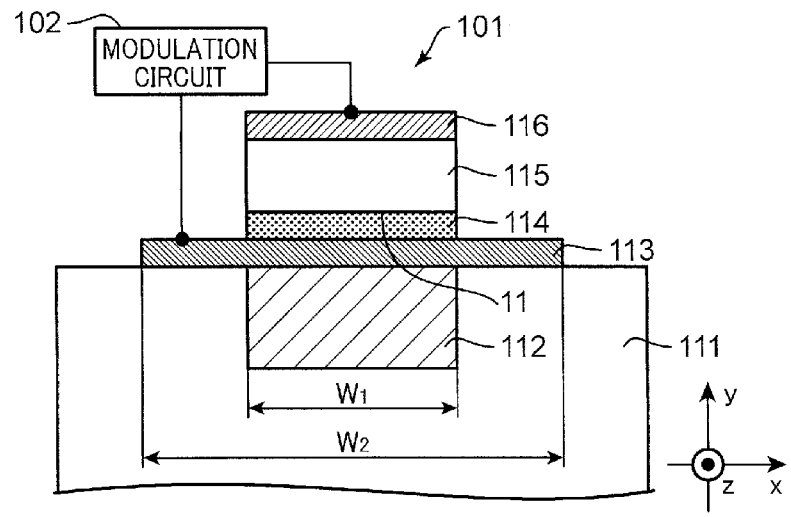
FIG. 3 is a front view of a light modulator according to Embodiment 1 of the present invention.

FIG. 1 to FIG. 3 are schematic diagrams of a plasmon modulator (light modulator) 101 according to Embodiment 1 of the present invention. FIG. 1 is a top view of the plasmon modulator 101 according to Embodiment 1 of the present invention. FIG. 2 is a cross-sectional view of the plasmon modulator 101 shown in FIG. 1, the view being taken along line II-II in FIG. 1. FIG. 3 is a front view of the plasmon modulator 101 according to Embodiment 1 of the present invention.

In FIG. 1 to FIG. 3, the plasmon modulator 101 includes a waveguide 112 formed on a clad 111 and through which guided light propagates, a metal layer 113 formed adjacent to the waveguide 112, a conductive oxide layer 114 formed on the metal layer 113 and having electrical conductivity, an insulating layer 115 formed on the conductive oxide layer 114, and a conductive layer 116 formed on the insulating layer 115. In FIG. 1 to FIG. 3, an x direction indicates a width direction of the waveguide, a y direction indicates a thickness direction of the waveguide, and a z direction indicates a propagating direction of the guided light. Furthermore, the y direction is a direction in which the layers are stacked, and the x direction is perpendicular to the z direction (the propagating direction of the guided light) and the y direction (the direction in which the layers are stacked). The above description also applies to the x direction, the y direction, and the z direction in other figures.

The thickness of the conductive oxide layer 114 is smaller than the wavelength of guided light in vacuum. An interface 11 between the conductive oxide layer 114 and the insulating layer 115 is formed at a distance shorter than the wavelength of the guided light in vacuum, from a surface of the metal layer 113 which is not adjacent to the waveguide 112. A modulation circuit 102 applies a voltage between the metal layer 113 and the conductive layer 116 to modulate output light.

The conductive oxide layer 114 is formed on the surface, of the metal layer 113, which is not adjacent to the waveguide. The insulating layer 115 is formed adjacent to the conductive oxide layer 114. The conductive layer 116 functions as an electrode that applies a voltage to the insulating layer 115. The modulation circuit 102 applies a voltage between the metal layer 113 and one of the conductive oxide layer 114 and the insulating layer 115.

SPP can be present at the interface between the metal layer 113 and the conductive oxide layer 114. The energy of the guided light couples to and is absorbed by the SPP when a phase matching condition between the guided light and the SPP is met. The wavenumber of the SPP depends on the refractive index of an area around the interface. The modulation circuit 102 applies a voltage between the metal layer 113 and the conductive layer 116 to change the refractive index of the conductive oxide layer 114. This changes the phase matching condition between the guided light and the SPP to modulate light. A mechanism for a change in the refractive index of the conductive oxide layer 114 will be described below.

The clad 111 is formed of a substance with a lower refractive index than the waveguide 112, for example, glass or resin. The waveguide 112 is a channel waveguide in which light is two-dimensionally contained. The thickness and width of the waveguide 112 are preferably designed so as to place the waveguide 112 in a single mode. This uniquely determines the effective refractive index of a guided mode excited in the waveguide 112 to allow the guided light to be efficiently coupled to the SPP. A material of the waveguide 112 is, for example, SiN, which is higher than glass in refractive index. The wavelength of incident light in vacuum is in a visible light region equal to or longer than 500 nm and equal to or shorter than 800 nm. The incident light is linearly polarized in the thickness direction of the waveguide. Guided light propagating through the waveguide 112 is linearly propagated light. The main polarization direction of the guided light propagating through the waveguide 112 is perpendicular to the metal layer 113. The main polarization direction of the guided light is the polarization direction of, for example, 50% or more of the guided light passing through the waveguide 112.

In the waveguide 112, the incident light excites guided light in a TM mode for which the main polarization direction corresponds to the thickness direction of the waveguide. The only guided light that can couple to the SPP is the guided light in the TM mode which is subjected to polarization with components perpendicular to the surface of the metal layer 113. Thus, placing the guided light in the TM mode allows a high degree of modulation to be achieved.

A material of the metal layer 113 may be metal such as gold or silver which can excite surface plasmon resonance. Furthermore, as shown in FIG. 3, the width $W_2$ of the metal layer 113 is larger than the width $W_1$ of the waveguide 112 ($W_2 > W_1$). This configuration allows efficient radiation of the energy of the guided light absorbed by the metal layer 113 in the form of heat after coupling to the SPP.

The conductive oxide layer 114 is formed of, for example, ITO or IZO. Furthermore, the thickness of the conductive oxide layer 114 is equal to or shorter than the wavelength of the guided light in vacuum. Moreover, the thickness of the conductive oxide layer 114 is preferably equal to or larger than 5 nm and more preferably, for example, equal to or larger than 10 nm. The insulating layer 115 is formed of an insulator, for example, $SiO_2$, which is lower than the waveguide 112 in refractive index. A material of the conductive layer 116 may be any conductive substance and may be metal or conductive oxide.

Such a multilayer structure of the plasmon modulator 101 is produced using a sputtering method, a deposition method, or a photolithography technique.

Figure 4:
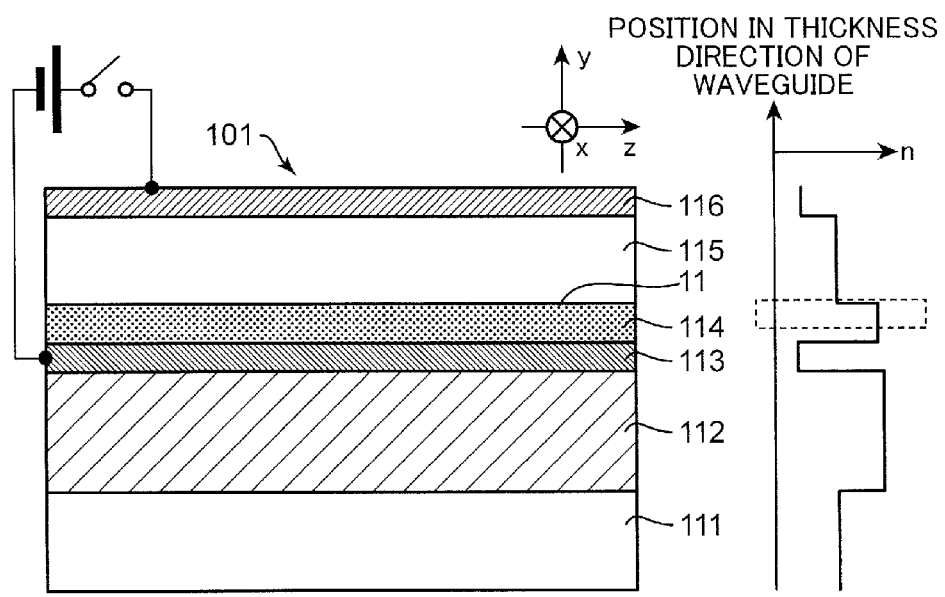
FIG. 4 is a diagram showing a cross section of a plasmon modulator and the distribution of a refractive index observed when a modulation circuit applies no voltage between a metal layer and a conductive layer.
Figure 5:
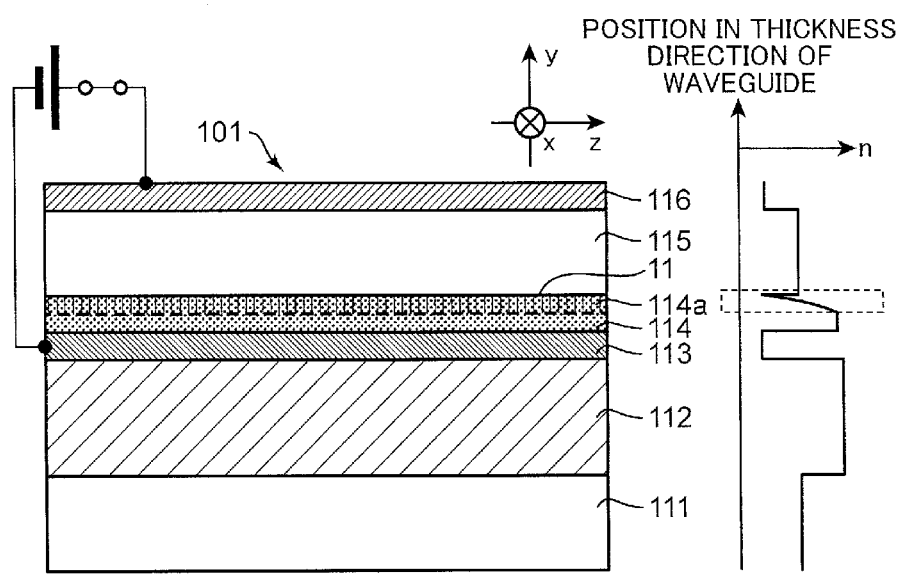
FIG. 5 is a diagram showing a cross section of the plasmon modulator and the distribution of the refractive index observed when the modulation circuit applies a voltage between the metal layer and the conductive layer.

A change in the refractive index of the conductive oxide layer 114 caused by the modulation circuit 102 by applying a voltage between the metal layer 113 and the conductive layer 116 will be described with reference to FIG. 4 and FIG. 5. FIG. 4 is a diagram showing a cross section of the plasmon modulator 101 and the distribution of a refractive index n observed when the modulation circuit 102 applies no voltage between the metal layer 113 and the conductive layer 116. FIG. 5 is a diagram showing a cross section of the plasmon modulator 101 and the distribution of the refractive index n observed when the modulation circuit 102 applies a voltage between the metal layer 113 and the conductive layer 116.

In FIG. 5, when a voltage is applied between the metal layer 113 and the conductive layer 116, an electron density change layer 114a in which electron density increases or decreases is generated in an area in the conductive oxide layer 114 near the interface 11 between the conductive oxide layer 114 and the insulating layer 115.

According to Non Patent Literature (Eyal Feigenbaum, Kenneth Diest and Harry A. Atwater, "Unity-Order Index Change in Transparent Conducting Oxides at Visible Frequencies", Nano Letters, October 2010, 2111-2116), a conductive oxide layer with an electron density equal to or higher than $10^{19}$ cm$^{-3}$ and equal to or lower than $10^{21}$ cm$^{-3}$ undergoes a significant change in refractive index due to the electron density change and exhibits high transmittance, in a visible light region of wavelength equal to or larger than 500 nm and equal to or smaller than 800 nm.

The Non Patent Literature reports changes in refractive index observed when a metal electrode, a conductive oxide layer, an insulating layer, and a metal electrode are stacked and ITO is used as a conductive oxide. Furthermore, the Non Patent Literature reports that application of an electric field of 25 V/um to the insulating layer changes the refractive index of ITO from 1.95 to 0.55 within a very small range of distance of about 5 nm from the interface between the conductive oxide layer and the insulating layer.

In general, the SPP is localized in an area at a distance equal to or shorter than the wavelength of light, from a metal surface, and thus, the phase matching condition for the SPP depends substantially on the refractive index of the neighborhood of the metal surface. Thus, since the interface 11 between the conductive oxide layer 114 and the insulating layer 115 is formed in an area at a distance equal to or shorter than the wavelength of light in vacuum, from the surface of the metal layer 113, the electron density change layer 114a can be formed near the metal layer 113. This enables an increase in the amount of change in the phase matching condition for the SPP resulting from a change in the refractive index of the electron density change layer 114a. For an enhanced effect of the electron density change layer 114a, the conductive oxide layer 114 is desirably equal to or smaller than 100 nm in thickness.

Figure 6:
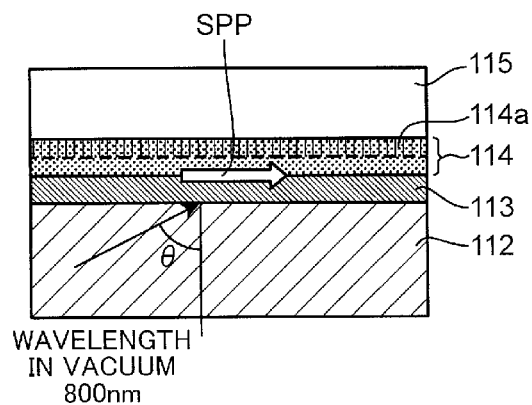
FIG. 6 is a diagram showing a reflectance calculation model for calculating a change in the reflectance of a multilayer film depending on whether or not an electron density change layer is present.
Figure 7:
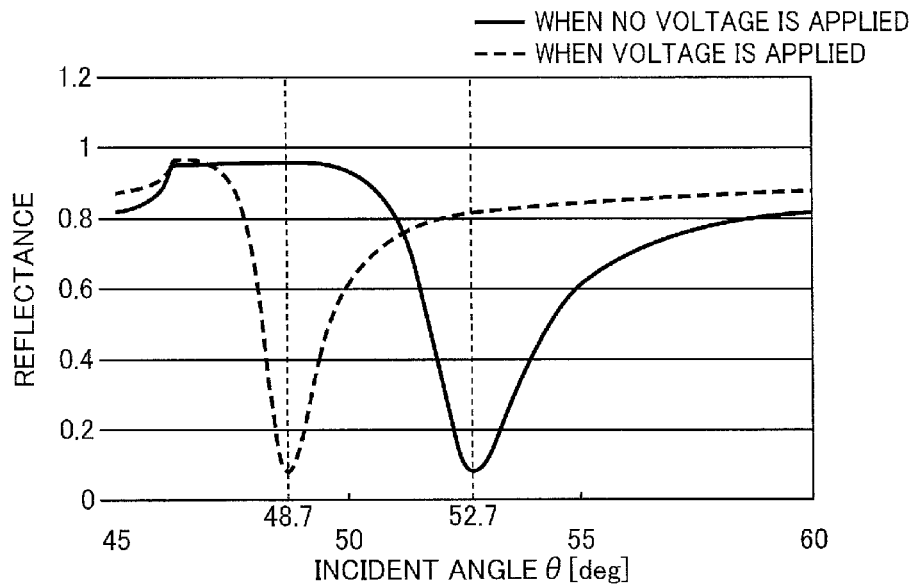
FIG. 7 is a diagram showing the result of calculation of the reflectance obtained when light with a wavelength of 800 nm in vacuum travels from a waveguide side into the metal layer at an incident angle θ.

With reference to FIG. 6 and FIG. 7, a change in the phase matching condition between the SPP and the guided light depending on the presence or absence of the electron density change layer 114a will be described. FIG. 6 is a diagram showing a reflectance calculation model for calculating a change in the reflectance of the multilayer film based on the presence or absence of the electron density change layer 114a. The reflectance calculation model is obtained by modeling using a multilayer including a stack of a metal layer 113 formed of Ag, a conductive oxide layer 114 formed of ITO, an electron density change layer 114a generated inside the conductive oxide layer 114, and an insulating layer 115 formed of $SiO_2$, the metal layer 113, the conductive oxide layer 114, the electron density change layer 114a, and the insulating layer 115 being stacked in this order on a waveguide 112 formed of SiN.

The waveguide 112 (SiN) has a semi-infinite thickness and a refractive index of 2.01. The metal layer 113 (Ag) has a thickness of 40 nm and a refractive index of 0.169+4.878i. The conductive oxide layer 114 (ITO) has a thickness of 20 nm, and the electron density change layer 114a, generated during application of a voltage, has a thickness of 5 nm. The conductive oxide layer 114 (ITO) has a refractive index of 1.95, and the electron density change layer 114a (ITO) has a refractive index of 0.8. The insulating layer 115 ($SiO_2$) has a semi-infinite thickness and a refractive index of 1.45.

FIG. 7 is a diagram showing the result of calculation of the reflectance obtained when light with a wavelength of 800 nm in vacuum travels from the waveguide 112 side into the metal layer 113 at an incident angle θ. In FIG. 7, the phase matching condition between the incident light and the SPP is met at an angle at which the reflectance is minimized.

A solid line in FIG. 7 indicates the dependence of the reflectance on the incident angle observed when no voltage is applied. When no voltage is applied, the reflectance is minimized at an incident angle θ of 52.7 degrees, meeting the phase matching condition. The effective refractive index of the waveguide 112 corresponding to an incident angle θ of 52.7 degrees is 1.60. On the other hand, a dashed line in FIG. 7 indicates the dependence of the reflectance on the incident angle observed when a voltage is applied. When a voltage is applied, the reflectance is minimized at an incident angle θ of 48.7 degrees, meeting the phase matching condition. The effective refractive index of the waveguide 112 corresponding to an incident angle θ of 48.7 degrees is 1.51.

Theses results indicate that the effective refractive index of the waveguide 112 meeting the phase matching condition changes significantly from 1.60 to 1.51 depending on whether or not an applied voltage is present.

Furthermore, the distance at which the energy of the SPP determined by a calculation for the multilayer film attenuated to $1/e^2$ was 5.1 um when no voltage was applied, and was 8.5 um when a voltage was applied. Thus, the energy of the guided light, after being absorbed by the SPP, attenuates rapidly, and thus, the energy of the SPP is prevented from re-coupling to the guided light. The SPP attenuates within a short distance, enabling a reduction in the length of the modulator.

A mechanism in which a voltage is applied between the metal layer 113 and the conductive layer 116 to modulate output light will be described taking, as an example, a case where, in the reflectance calculation model in FIG. 6, the waveguide 112 is designed to have an effective refractive index of 1.51.

When the waveguide 112 is designed to have an effective refractive index of 1.51, an electron density change layer 114a is generated in the conductive oxide layer 114 upon application of a voltage to meet the phase matching condition between the guided light and the SPP. The guided light couples to the SPP propagating along the interface between the metal layer 113 and the conductive oxide layer 114. The energy of the guided light is absorbed by the SPP. The SPP is a wave localized on a metal surface, and thus, much of the energy of the SPP is absorbed by the metal. Thus, the energy transferred from the guided light to the SPP is immediately lost, preventing the SPP from re-coupling to the guided light. As described above, when a voltage is applied, the energy of the guided light is absorbed by the metal layer 113, reducing the amount of light output from the waveguide 112.

On the other hand, when no voltage is applied, the electron density change layer 114a is not generated. In this case, the phase matching condition between the guided light and the SPP is precluded from being met, preventing the guided light and the SPP from being coupled together. Thus, when no voltage is applied, the guided light is prevented from being significantly attenuated, increasing the amount of light output from the waveguide 112.

Furthermore, when the waveguide 112 is designed to have an effective refractive index of 1.60, an increased amount of light is output from the waveguide 112 when a voltage is applied.

As described above, the output light can be modulated by controlling the presence or absence of coupling between the guided light and the SPP depending on whether or not an applied voltage is present.

As described above, the plasmon modulator 101 according to Embodiment 1 includes the conductive oxide layer 114 formed on the metal layer 113 and having electrical conductivity, and the insulating layer 115 formed on the conductive oxide layer 114. Furthermore, the interface 11 at which the conductive oxide layer 114 and the insulating layer 115 are adjacent to each other is formed at a distance shorter than the wavelength of the guided light in vacuum, from the surface of the metal layer 113 which is not adjacent to the waveguide 112. Thus, the refractive index changes significantly in an area in the conductive oxide layer 114 near the interface 11 between the conductive oxide layer 114 and the insulating layer 115. Consequently, an increased degree of modulation and a high modulation speed can be achieved even when the light modulator is small in length.

Furthermore, the plasmon modulator 101 includes the conductive oxide layer 114 formed on the metal layer 113 and having electrical conductivity and the insulating layer 115 formed on the conductive oxide layer 114. This enables an increase in the thickness of the insulating layer 115, allowing suppression of a possible parasitic capacitance generated by the conductive layer 116 and the metal layer 113. As a result, high-speed light modulation can be carried out.

Furthermore, in the plasmon modulator 101 according to Embodiment 1, the guided light propagating through the waveguide 112 has a wavelength equal to or larger than 500 nm and equal to or smaller than 800 nm in vacuum. This increases the amount of change in the refractive index with respect to a change in the electron density of the conductive oxide layer 114, allowing a high degree of modulation to be achieved.

Furthermore, in the plasmon modulator 101 according to Embodiment 1, the guided light propagating through the waveguide 112 is linearly polarized light, and the main polarization direction of the guided light is perpendicular to the metal layer 113. Thus, the guided light and the SPP can be efficiently coupled together, resulting in a high degree of modulation.

Additionally, in the plasmon modulator 101 according to Embodiment 1, the width $W_2$ of the metal layer 113 is larger than the width $W_1$ of the waveguide 112. This allows efficient radiation of heat generated by the energy of the guided light absorbed by the metal layer 113 as a result of coupling to the SPP.

According to Embodiment 1, the guided light propagating through the waveguide 112 has a wavelength equal to or larger than 500 nm and equal to or smaller than 800 nm in vacuum. However, the wavelength of the guided light in vacuum may be, for example, a near-infrared wavelength provided that the electron density of the conductive oxide layer 114 is adjusted to such a value at which the refractive index changes with respect to the wavelength utilized. The wavelength of the guided light in vacuum is not particularly limited to the range of at least 500 nm and at most 800 nm.

Figure 8:
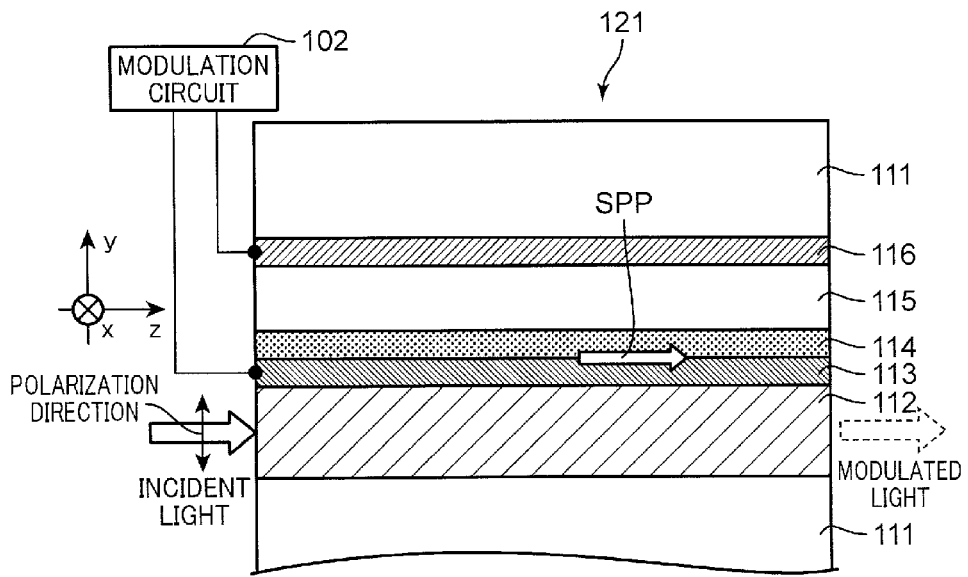
FIG. 8 is a cross-sectional view, in the width direction of the waveguide, of a plasmon modulator according to a first variation of Embodiment 1 of the present invention.

FIG. 8 is a cross-sectional view, in the width direction of the waveguide, of a plasmon modulator 121 according to a first variation of Embodiment 1 of the present invention. As shown in FIG. 8, the clad 111 may further be stacked on the conductive layer 116. The plasmon modulator 121 shown in FIG. 8 further includes the clad 111 formed on the conductive layer 116. The clad 111 stacked on the conductive layer 116 enhances the symmetry of the waveguide 112, thus improving the efficiency of the coupling between guided light and SPP.

Figure 9:
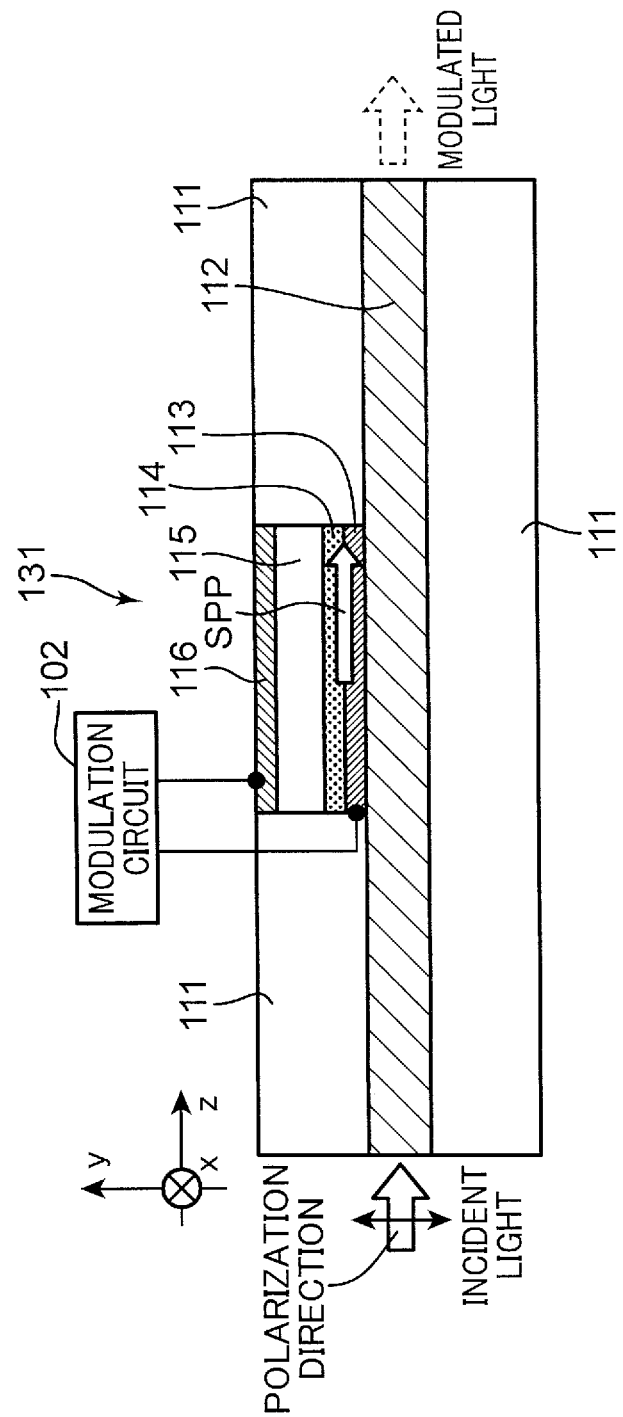
FIG. 9 is a cross-sectional view, in the width direction of the waveguide, of a plasmon modulator according to a second variation of Embodiment 1 of the present invention.

FIG. 9 is a cross-sectional view, in the width direction of the waveguide, of a plasmon modulator 131 according to a second variation of Embodiment 1 of the present invention. As shown in FIG. 9, the metal layer 113, the conductive oxide layer 114, the insulating layer 115, and the conductive layer 116 may be arranged on a part of the waveguide 112. That is, each of the metal layer 113, the conductive oxide layer 114, the insulating layer 115, and the conductive layer 116 may have a smaller length in the propagating direction of the guided light than the length of the waveguide 112 in the propagating direction of the guided light. Furthermore, each of the metal layer 113, the conductive oxide layer 114, and the insulating layer 115 may be smaller than the waveguide 112 in the length in the propagating direction of the guided light. Since each of the metal layer 113, the conductive oxide layer 114, the insulating layer 115, and the conductive layer 116 is smaller than the waveguide 112 in the length in the propagating direction of the guided light, the plasmon modulator 131 can be easily handled.

Figure 10:
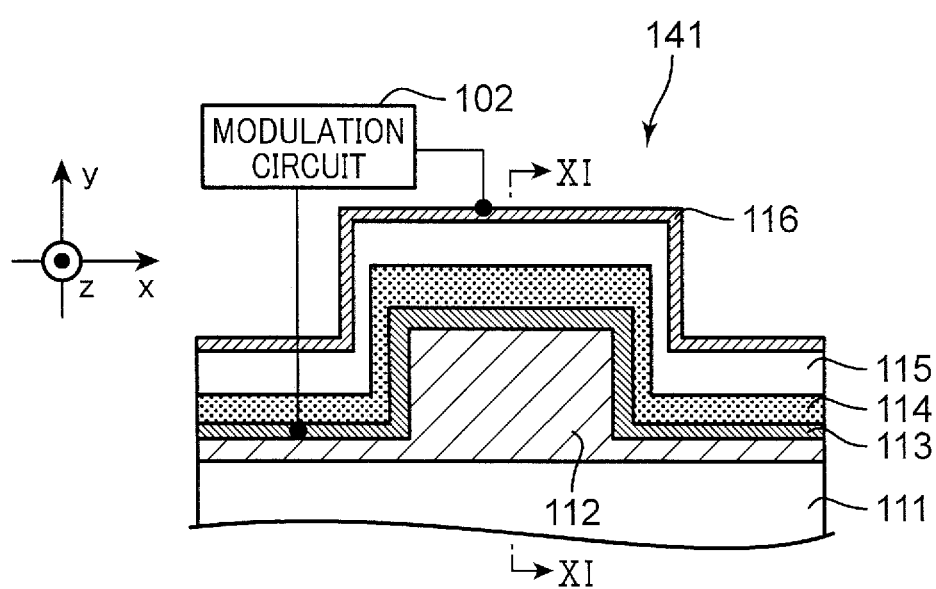
FIG. 10 is a front view of a plasmon modulator according to a third variation of Embodiment 1 of the present invention.
Figure 11:
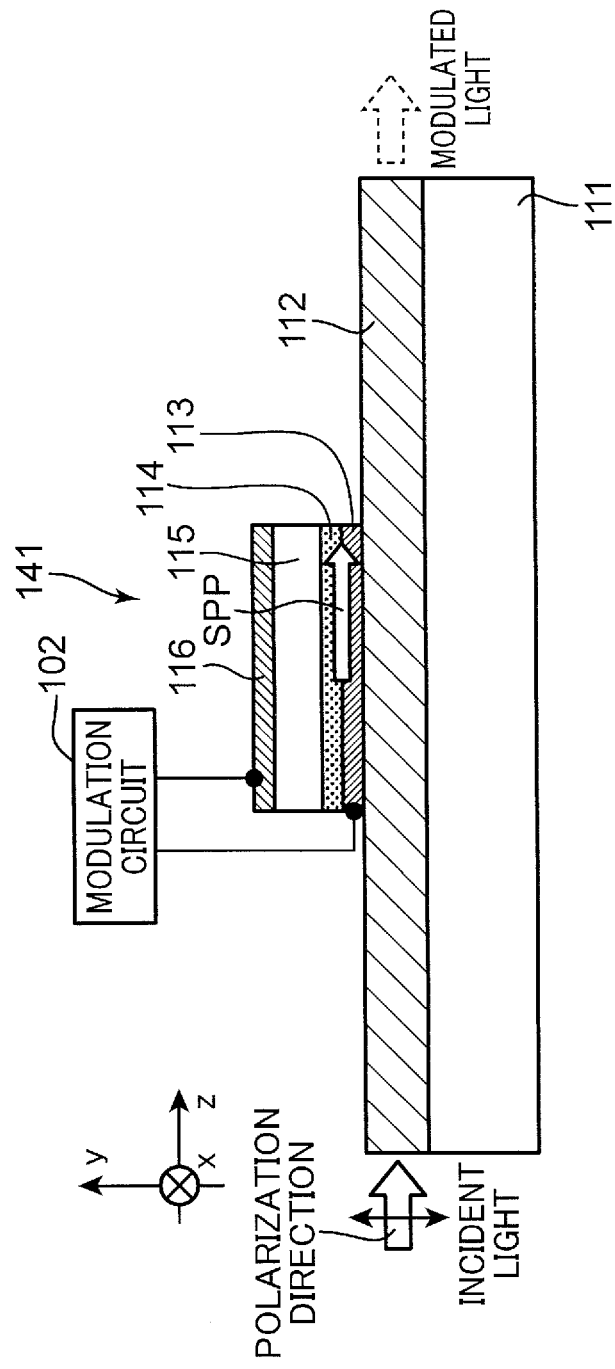
FIG. 11 is a cross-sectional view of the plasmon modulator shown in FIG. 10, the view being taken along line XI-XI in FIG. 10.

FIG. 10 shows a front of a plasmon modulator 141 according to a third variation of Embodiment 1 of the present invention. FIG. 11 is a cross-sectional view of the plasmon modulator 141 shown in FIG. 10, the view being taken along line XI-XI in FIG. 10. As shown in FIG. 10 and FIG. 11, the waveguide 112 may be a ridge waveguide. Alternatively, the waveguide 112 may be a rib waveguide.

Furthermore, as shown in FIG. 10 and FIG. 11, the metal layer 113, the conductive oxide layer 114, the insulating layer 115, and the conductive layer 116 need not be patterned with respect to the width direction of the waveguide. In FIG. 10 and FIG. 11, in the plasmon modulator 141, the metal layer 113, the conductive oxide layer 114, the insulating layer 115, and the conductive layer 116 are sequentially deposited on the waveguide 112 formed on the clad 111. This eliminates the need for patterning with respect to the width direction of the waveguide, facilitating production of the plasmon modulator 141.

Figure 12:
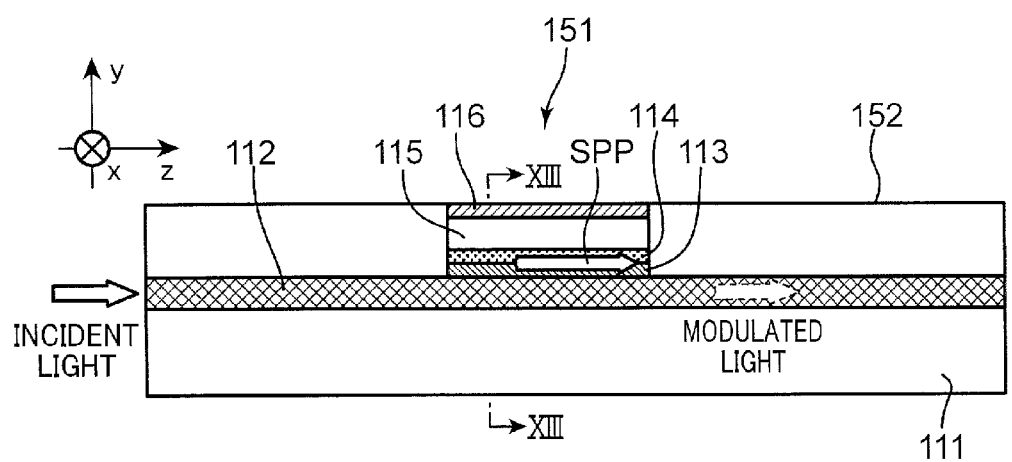
FIG. 12 is a cross-sectional view, in the width direction of the waveguide, of a plasmon modulator according to a fourth variation of Embodiment 1 of the present invention.
Figure 13:
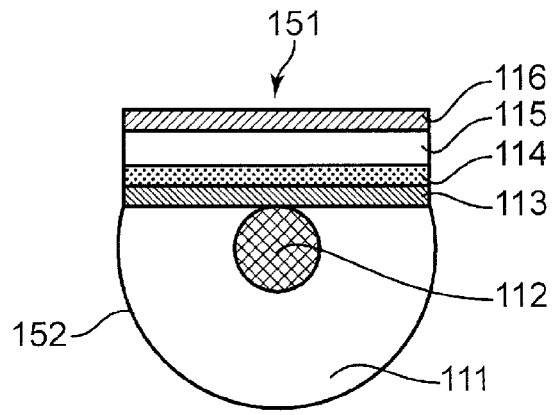
FIG. 13 is a cross-sectional view of the plasmon modulator shown in FIG. 12, the view being taken along line XIII-XIII in FIG. 12.

Additionally, the plasmon modulator may be formed in an optical fiber. FIG. 12 is a cross-sectional view, in the width direction of the waveguide, of a plasmon modulator 151 formed in the optical fiber 152 according to a fourth variation of Embodiment 1 of the present invention. FIG. 13 is a cross-sectional view of the plasmon modulator 151 shown in FIG. 12, the view being taken along line XIII-XIII in FIG. 12.

The plasmon modulator 151 eliminates the need for a crystal growth step of a production process, and can be produced by sputtering or film formation based on deposition. Thus, the plasmon modulator 151 can be formed in the optical fiber 152. In FIG. 12 and FIG. 13, the clad 111 of the optical fiber 152 is partly cut to form the plasmon modulator 151. The plasmon modulator 151 formed inside the optical fiber 152 eliminates the need to couple guided light to the externally provided light modulator. Thus, the coupling loss of the waveguide can be suppressed. Furthermore, the optical fiber 152 also serves as a light modulator, thus suppressing the production cost of the light modulator.

Figure 14:
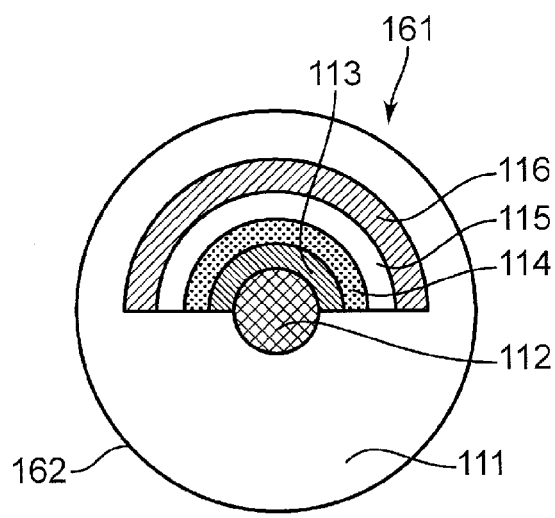
FIG. 14 is a cross-sectional view, in the width direction of the waveguide, of a plasmon modulator according to a fifth variation of Embodiment 1 of the present invention.
Figure 15:
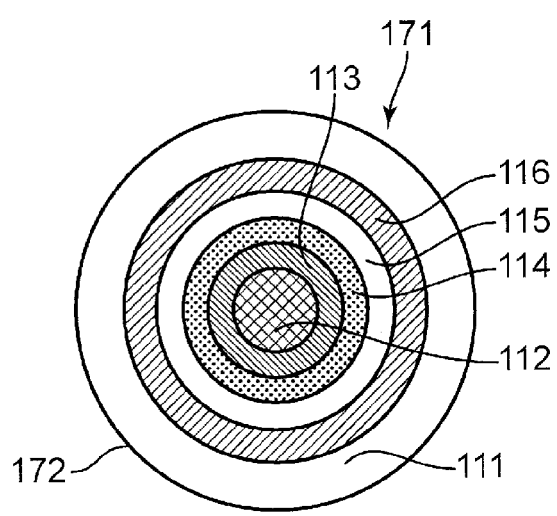
FIG. 15 is a cross-sectional view, in the width direction of the waveguide, of a plasmon modulator according to a sixth variation of Embodiment 1 of the present invention.

Other examples of the configuration forming a plasmon modulator in the optical fiber are shown in FIG. 14 and FIG. 15.

FIG. 14 is a cross-sectional view, in the propagating direction of the guided light, of a plasmon modulator 161 formed in an optical fiber 162 according to a fifth variation of Embodiment 1 of the present invention.

As shown in FIG. 14, the plasmon modulator 161 in the optical fiber 162 may have a semicircular cross-sectional shape. That is, the metal layer 113, the conductive oxide layer 114, the insulating layer 115, and the conductive layer 116, all having semicircular cross sections, may be stacked on the waveguide 112 with a circular cross section. Furthermore, the clad 111 is formed to surround the waveguide 112, the metal layer 113, the conductive oxide layer 114, the insulating layer 115, and the conductive layer 116.

FIG. 15 is a cross-sectional view, in the propagating direction of the guided light, of a plasmon modulator 171 formed in an optical fiber 172 according to a sixth variation of Embodiment 1 of the present invention.

As shown in FIG. 15, the plasmon modulator 171 in the optical fiber 172 may have a circular cross sectional shape. That is, the metal layer 113, the conductive oxide layer 114, the insulating layer 115, and the conductive layer 116, all having circular cross sections, may be stacked around the waveguide 112 with a circular cross section. Furthermore, the clad 111 is formed to surround the conductive layer 116.

Embodiment 2

Figure 16:
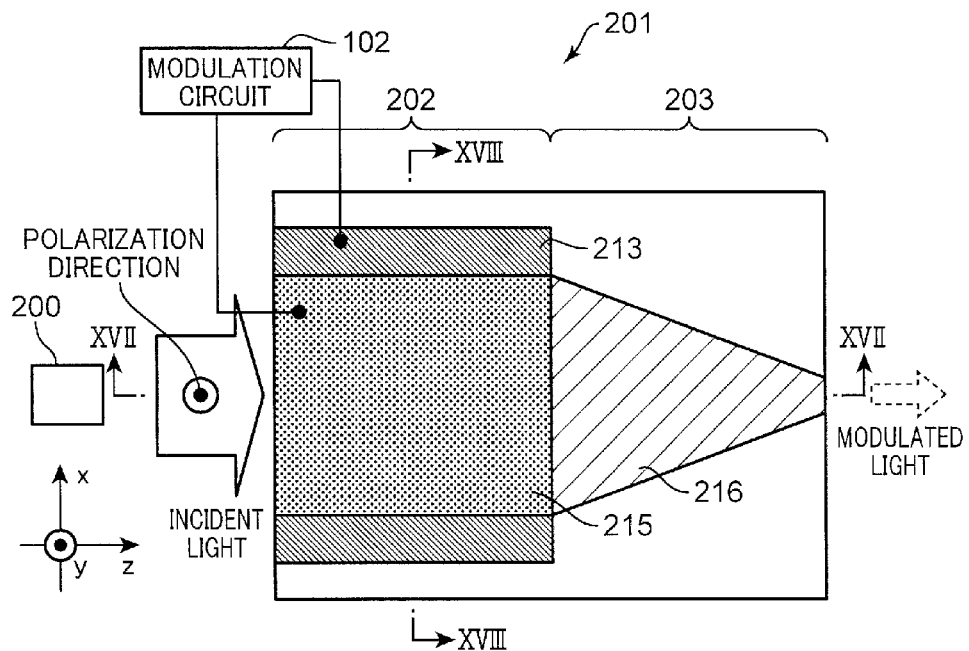
FIG. 16 is a top view of a light modulation module according to Embodiment 2 of the present invention.
Figure 17:
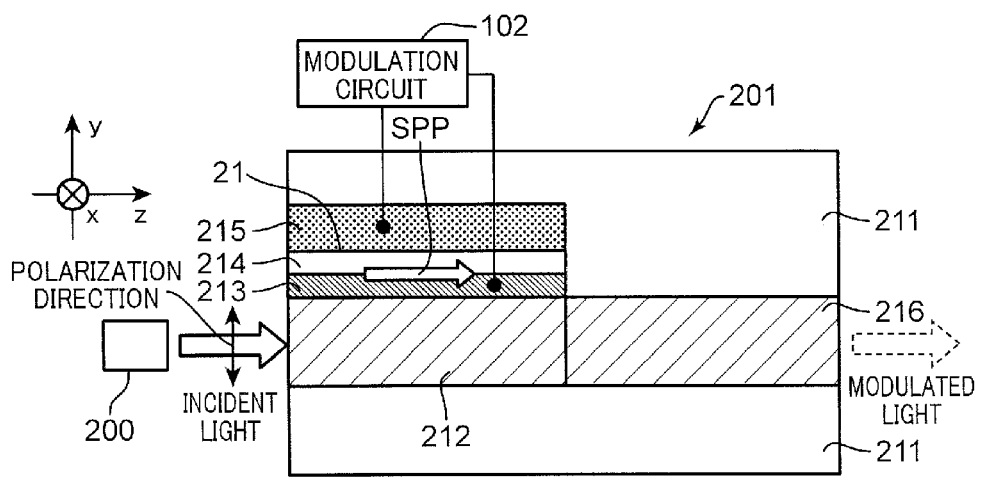
FIG. 17 is a cross-sectional view of the light modulation module shown in FIG. 16, the view being taken along line XVII-XVII in FIG. 16.
Figure 18:
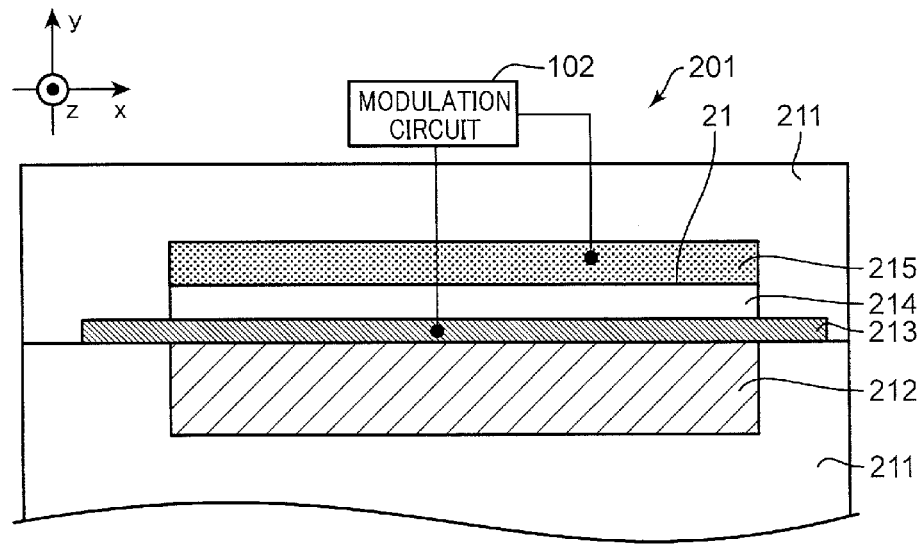
FIG. 18 is a cross-sectional view of the light modulation module shown in FIG. 16, the view being taken along line XVIII-XVIII in FIG. 16.

FIG. 16 to FIG. 18 are schematic diagrams of a light modulation module 201 according to Embodiment 2 of the present invention. Components in FIG. 16 to FIG. 18 which are the same as corresponding components in FIG. 1 to FIG. 3 are denoted by the same reference numerals and will not be described below. FIG. 16 is a top view of the light modulation module 201 according to Embodiment 2 of the present invention. FIG. 17 is a cross-sectional view of the light modulation module 201 shown in FIG. 16, the view being taken along line XVII-XVII in FIG. 16. FIG. 18 is a cross-sectional view of the light modulation module 201 shown in FIG. 16, the view being taken along line in FIG. 16.

In FIG. 16 to FIG. 18, the light modulation module 201 includes a light source 200, a slab plasmon modulator (light modulator) 202 with a wide waveguide, and a spot size converter 203 formed on the same substrate as that on which the slab plasmon modulator 202 is formed. The light source 200 inputs light to the slab plasmon modulator 202. The spot size converter 203 includes a tapered waveguide 216 connected to the slab plasmon modulator 202 and having a width gradually decreasing in the propagating direction of the guided light.

The slab plasmon modulator 202 includes a slab waveguide 212 formed on the clad 211 and through which guided light propagates, a metal layer 213 formed adjacent to the slab waveguide 212, an insulating layer 214 formed on the metal layer 213, and a conductive oxide layer 215 formed on the insulating layer 214 and having electrical conductivity. In the slab plasmon modulator 202, the conductive oxide layer 215 functions as an electrode for applying a voltage to the insulating layer 214. That is, the conductive oxide layer 215 also functions as the conductive layer 116 according to Embodiment 1.

The thickness of the insulating layer 214 is smaller than the wavelength of the guided light in vacuum. An interface 21 between the insulating layer 214 and the conductive oxide layer 215 is formed at a distance shorter than the wavelength of the guided light in vacuum, from a surface of the metal layer 213 which is not adjacent to the slab waveguide 212. A modulation circuit 102 applies a voltage between the metal layer 213 and the conductive oxide layer 215 to modulate output light.

SPP can be present at the interface between the metal layer 213 and the insulating layer 214. The energy of the guided light couples to and is absorbed by the SPP when a phase matching condition between the guided light and the SPP is met. The wavenumber of the SPP depends on the refractive index of an area around the interface. The modulation circuit 102 applies a voltage between the metal layer 213 and the conductive oxide layer 215 to change the refractive index of the conductive oxide layer 215. This changes the phase matching condition between the guided light and the SPP to modulate light. A mechanism for a change in the refractive index of the conductive oxide layer 215 will be described below.

The clad 211 is further stacked on the conductive oxide layer 215, thus enhancing the symmetry of the guided light. This enables an increase in the efficiency of coupling between incident light and the guided light and the efficiency of coupling between the slab plasmon modulator 202 and the spot size converter 203.

The clad 211 is formed of a substance with a lower refractive index than the slab waveguide 212, for example, glass or resin. The waveguide 212 is a slab waveguide in which light is one-dimensionally contained. The thickness of the slab waveguide 212 is preferably designed so as to place the slab waveguide 212 in a single mode. This uniquely determines the effective refractive index in a guided mode excited in the slab waveguide 212 to allow the guided light to be efficiently coupled to the SPP. A material of the slab waveguide 212 is, for example, SiN, which is higher than glass in refractive index.

Light is condensed only in the thickness direction of the waveguide by a cylindrical lens so as to enter the slab waveguide 212. Thus, the slab plasmon modulator 202 has the advantage of eliminating the need for alignment accuracy for incident light with respect to the width direction of the waveguide. The width of the slab waveguide 212 may be equal to or larger than the spot size of the incident light in the width direction. The incident light is linearly polarized in the thickness direction of the waveguide.

In the slab waveguide 212, the incident light excites guided light in the TM mode for which the main polarization direction corresponds to the thickness direction of the waveguide. The only guided light that can couple to the SPP is the guided light in the TM mode. Thus, placing the guided light in the TM mode allows a high degree of modulation to be achieved.

A material of the metal layer 213 may be metal such as gold or silver which can excite surface plasmon resonance. The insulating layer 214 is formed of an insulator, for example, $SiO_2$, which is lower than the slab waveguide 212 in refractive index. Furthermore, the thickness of the insulating layer 214 is equal to or smaller than the wavelength of the guided light in vacuum. Moreover, the thickness of the insulating layer 214 is preferably equal to or larger than 5 nm and more preferably, for example, equal to or larger than 10 nm. The conductive oxide layer 215 is formed of, for example, ITO or IZO.

The spot size converter 203 includes a tapered waveguide 216 sandwiched between pieces of the clad 211. The tapered waveguide 216 is smoothly connected to the slab waveguide 212 and has a width gradually decreasing in the propagating direction of the guided light. This enables a gradual reduction in the spot size, in the width direction of the waveguide, of light output from the slab waveguide 212. Thus, output light from the slab plasmon modulator 202 can be efficiently coupled to an optical fiber or the like.

The multilayer structure of the slab plasmon modulator 202 and the spot size converter 203 is produced using the sputtering method, the deposition method, or the photolithography technique.

Figure 19:
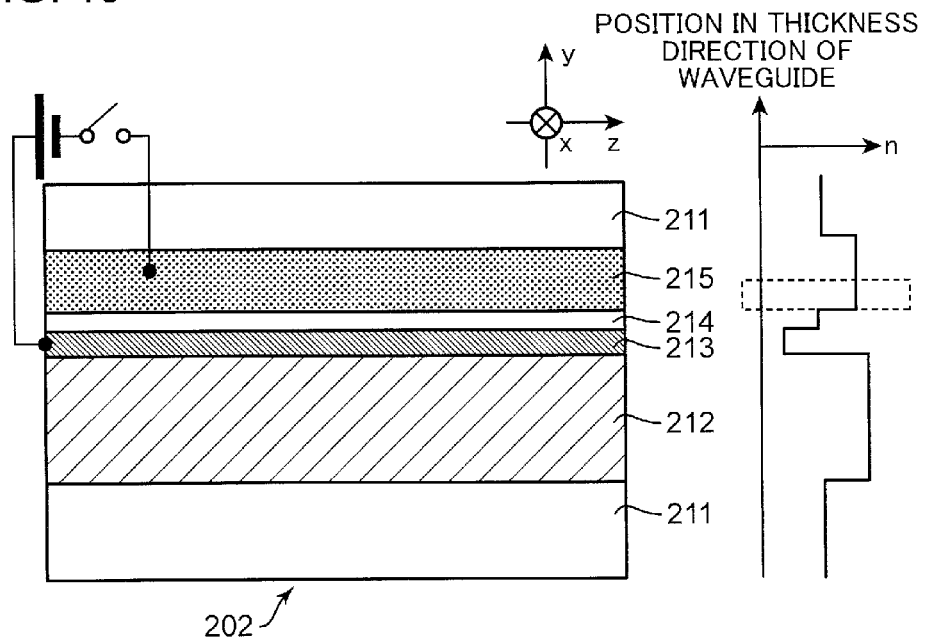
FIG. 19 is a diagram showing a cross section of a slab plasmon modulator and the distribution of the refractive index observed when a modulation circuit applies no voltage between a metal layer and a conductive oxide layer.
Figure 20:
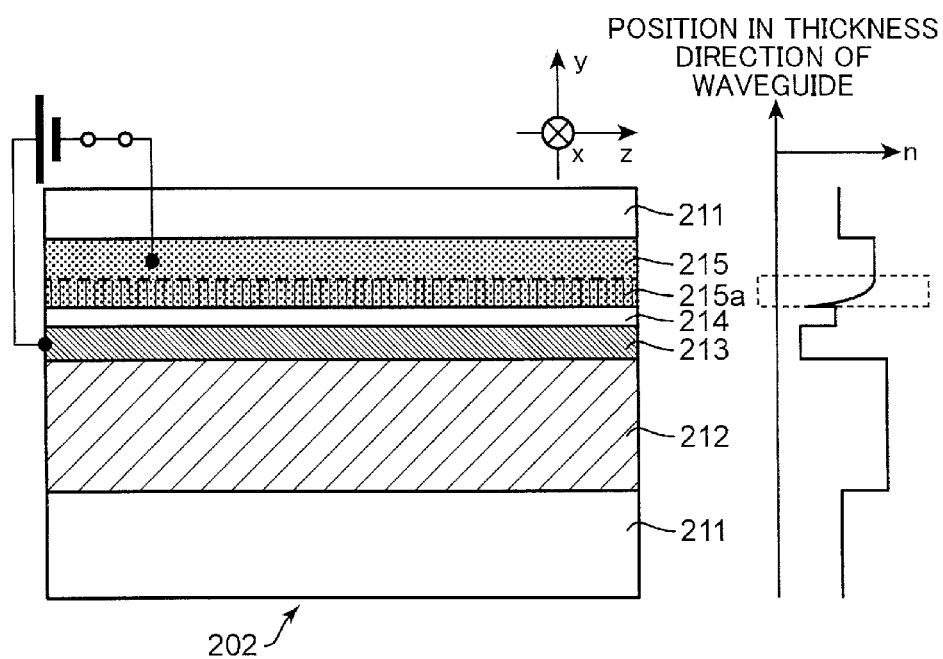
FIG. 20 is a diagram showing a cross section of the slab plasmon modulator and the distribution of the refractive index observed when the modulation circuit applies a voltage between the metal layer and the conductive oxide layer.

A change in the refractive index of the conductive oxide layer 215 caused by the modulation circuit 102 by applying a voltage between the metal layer 213 and the conductive oxide layer 215 will be described with reference to FIG. 19 and FIG. 20. FIG. 19 is a diagram showing a cross section of the slab plasmon modulator 202 and the distribution of the refractive index n observed when the modulation circuit 102 applies no voltage between the metal layer 213 and the conductive oxide layer 215. FIG. 20 is a diagram showing a cross section of the slab plasmon modulator 202 and the distribution of the refractive index n observed when the modulation circuit 102 applies a voltage between the metal layer 213 and the conductive oxide layer 215.

In FIG. 20, when a voltage is applied between the metal layer 213 and the conductive oxide layer 215, an electron density change layer 215a in which the electron density increases or decreases is generated in an area in the conductive oxide layer 215 near the interface between the insulating layer 214 and the conductive oxide layer 215. Based on a principle similar to the principle described above in Embodiment 1, a change in electron density significantly changes the refractive index of the electron density change layer 215a.

As described above in Embodiment 1, the phase matching condition for the SPP depends significantly on the refractive index near a metal surface. Thus, since the interface 21 between the conductive oxide layer 215 and the insulating layer 214 is formed in an area at a distance equal to or shorter than the wavelength of light in vacuum, from the surface of the metal layer 213, the electron density change layer 215a can be formed near the metal layer 213. This enables an increase in the amount of change in the phase matching condition for the SPP resulting from a change in the refractive index of the electron density change layer 215a. For an enhanced effect of the electron density change layer 215a, the insulating layer 214 is desirably equal to or smaller than 100 nm in thickness.

A mechanism in which a voltage is applied between the metal layer 213 and the conductive oxide layer 215 to modulate output light will be described taking, as an example, a case where the slab waveguide 212 is designed such that the guided light and the SPP meet the phase matching condition when a voltage is applied.

When a voltage is applied between the metal layer 213 and the conductive oxide layer 215, an electron density change layer 215a with the refractive index changed is generated in the conductive oxide layer 215. At this time, the phase matching condition between the guided light and the SPP is met. The guided light couples to the SPP propagating over the interface between the metal layer 213 and the insulating layer 214, and the energy of the guided light is absorbed by the SPP. The SPP is a wave localized on the metal surface, and thus, much of the energy is absorbed by the metal. Thus, the energy transferred from the guided light to the SPP is immediately lost, preventing the SPP from re-coupling to the guided light. As described above, when a voltage is applied, the energy of the guided light is absorbed by the metal layer 213, reducing the amount of light output from the slab waveguide 212.

On the other hand, when no voltage is applied, the electron density change layer 215a is not generated. In this case, the phase matching condition between the guided light and the SPP is precluded from being met, preventing the guided light and the SPP from being coupled together. Thus, when no voltage is applied, the guided light is prevented from being significantly attenuated, increasing the amount of light output from the slab waveguide 212.

Furthermore, when the slab waveguide 212 is designed such that the guided light and the SPP meet the phase matching condition while no voltage is applied, an increased amount of light is output from the slab waveguide 212 when a voltage is applied.

As described above, the output light can be modulated by controlling the presence or absence of coupling between the guided light and the SPP depending on whether or not an applied voltage is present.

As described above, the slab plasmon modulator 202 according to Embodiment 2 includes the insulating layer 214 formed on the metal layer 213 and the conductive oxide layer 215 formed on the insulating layer 214 and having electrical conductivity. Furthermore, the interface 21 at which the insulating layer 214 and the conductive oxide layer 215 are adjacent to each other is formed at a distance shorter than the wavelength of the guided light in vacuum, from the surface of the metal layer 213 which is not adjacent to the waveguide 112. Thus, the refractive index changes significantly in an area in the conductive oxide layer 215 near the interface 21 between the conductive oxide layer 215 and the insulating layer 214. Consequently, an increased degree of modulation and a high modulation speed can be achieved even when the light modulator is small in length.

Furthermore, the slab plasmon modulator 202 includes the insulating layer 214 formed on the metal layer 213 and the conductive oxide layer 215 formed on the insulating layer 214 and having electrical conductivity. This eliminates the need to reduce the thickness of the conductive oxide layer 215, allowing the slab plasmon modulator 202 to be easily produced.

Furthermore, the conductive oxide layer 215 also serves as an electrode to apply a voltage to the insulating layer 214, eliminating the need for a conductive layer. Thus, the slab plasmon modulator 202 can be easily produced.

Furthermore, in the slab plasmon modulator 202 according to Embodiment 2, the guided light propagating through the slab waveguide 212 is linearly polarized light, and the main polarization direction of the guided light is perpendicular to the metal layer 213. Thus, the guided light and the SPP can be efficiently coupled together, resulting in a high degree of modulation.

Furthermore, the slab plasmon modulator 202 according to Embodiment 2 includes a wide slab waveguide 212 as a waveguide. Thus, light can be easily input to the waveguide. Additionally, a surface of the metal layer 213 which contacts the slab waveguide 212 is large in area, thus allowing the guided light to be absorbed dispersively over a wide area. This allows the adverse effect of heat generated by the metal layer 213 to be suppressed.

Furthermore, the slab plasmon modulator 202 according to Embodiment 2 includes the tapered waveguide 216 connected to the slab waveguide 212 and having a width gradually decreasing in the propagating direction of the guided light. Thus, output light modulated by the slab plasmon modulator 202 can be efficiently coupled to an optical fiber or the like.

The main components of the light modulators described above in Embodiment 1 and Embodiment 2 are shown below.

The light modulators described in Embodiment 1 and Embodiment 2 include a waveguide through which guided light propagates, a metal layer formed adjacent to the waveguide, a conductive oxide layer having electrical conductivity and formed on a surface of the metal layer which is not adjacent to the waveguide, an insulating layer formed adjacent to the conductive oxide layer, and a modulation circuit that applies a voltage between the metal layer and one of the conductive oxide layer and the insulating layer. An interface between the conductive oxide layer and the insulating layer is faulted at a distance shorter than the wavelength of guided light in vacuum, from the surface of the metal layer which is not adjacent to the waveguide.

As described above, in the light modulators, the interface at which the conductive oxide layer and the insulating layer are adjacent to each other is formed at a distance shorter than the wavelength of guided light in vacuum, from the surface of the metal layer which is not adjacent to the waveguide. Thus, when a voltage is applied to the metal layer, the conductive oxide layer, and the insulating layer, the electron density of the conductive oxide layer near the interface between the conductive oxide layer and the insulating layer changes to cause a significant change in the refractive index of the conductive oxide layer near the interface. Consequently, a phase matching condition between the guided light and SPP changes significantly depending on whether or not an applied voltage is present. This increases a difference in the amount of attenuation of the guided light caused by coupling to the SPP depending on whether or not an applied voltage is present. Because of the great difference in the amount of attenuation of the guided light depending on whether or not an applied voltage is present, an increased degree of modulation and a high modulation speed can be achieved even when the light modulator is small in length. As a result, a light modulator can be implemented which has a small area and reduced parasitic capacitances and which can achieve a high modulation speed and a high degree of modulation.

Embodiment 3

Figure 21:
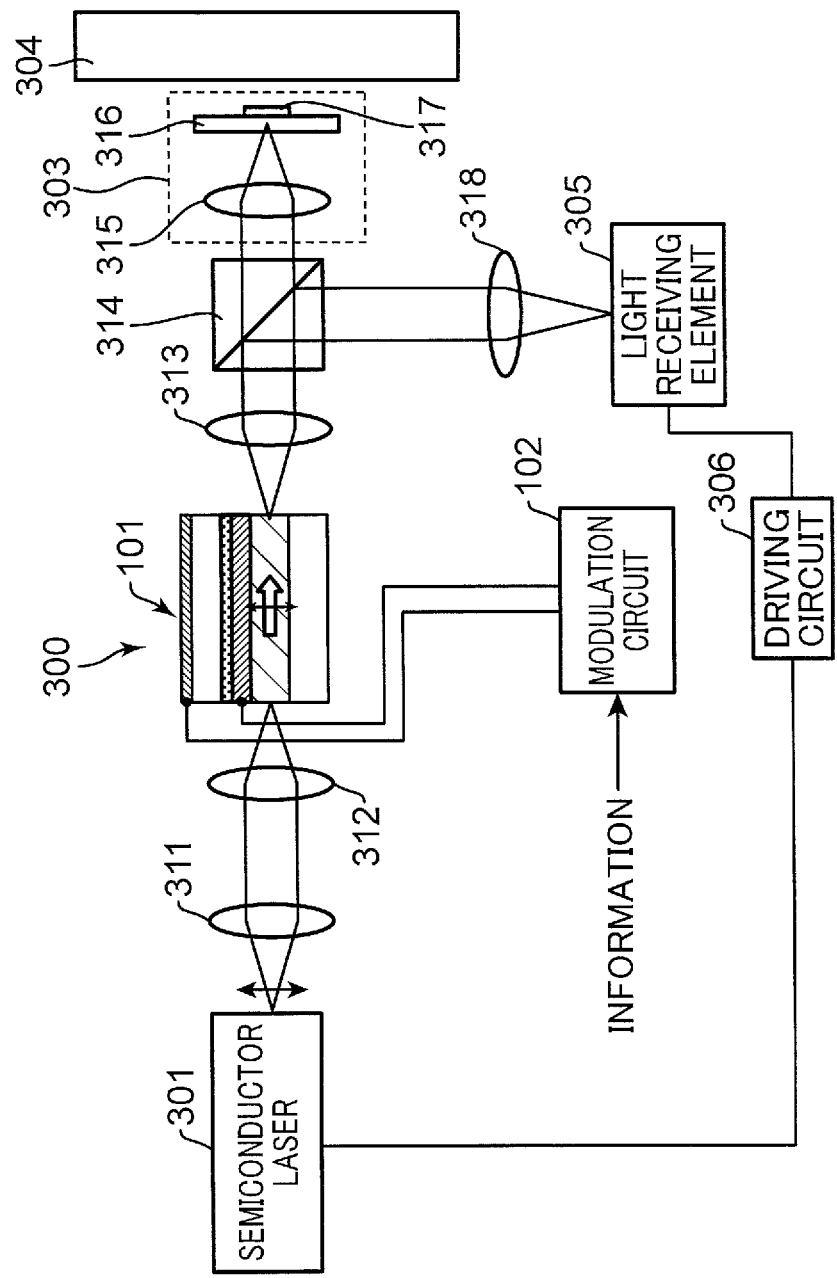
FIG. 21 is a schematic diagram of an optical pickup according to Embodiment 3 of the present invention.

FIG. 21 is a schematic diagram of an optical pickup according to Embodiment 3 of the present invention. Components in FIG. 21 which are the same as corresponding components in FIG. 1 to FIG. 3 are denoted by the same reference numerals and will not be described below.

In FIG. 21, an optical pickup 300 according to Embodiment 3 is an optical pickup that uses the plasmon modulator 101 according to Embodiment 1. As described above in Embodiment 1, the plasmon modulator 101 can output highly modulated light at a high speed, and thus drastically increase a rate at which the optical pickup 300 transfers information. The optical pickup 300 shown in FIG. 21 includes the plasmon modulator 101 according to Embodiment 1, a semiconductor laser 301 that inputs light to the plasmon modulator 101, and a collector 303 that condenses the light modulated by the plasmon modulator 101. Based on the modulated light condensed by the collector 303, the optical pickup 300 records information in an optical disc 304 that is an information recording medium.

More specifically, the optical pickup 300 includes the plasmon modulator 101, the semiconductor laser 301, the collector 303, a light receiving element 305, a driving circuit 306, a lens 311, a lens 312, a lens 313, a half mirror 314, and a lens 318.

The semiconductor laser 301 is driven by the driving circuit 306 to radiate light linearly polarized in the thickness direction of a waveguide. The lens 311 collimates light radiated by the semiconductor laser 301. The lens 312 collects the light collimated by the lens 311 at the plasmon modulator 101, and excites guided light in the TM mode inside the plasmon modulator 101. The modulation circuit 102 applies a voltage to the plasmon modulator 101 in accordance with information to be recorded in the optical disc 304, to modulate the guided light.

The plasmon modulator 101 outputs the modulated light modulated in accordance with the information to be recorded in the optical disc 304. The lens 313 collimates the modulated light output from the plasmon modulator 101. The half mirror 314 divides the modulated light collimated by the lens 313 into portions. The lens 318 collects the modulated light reflected by the half mirror 314 at the light receiving element 305. The light receiving element 305 detects the modulated light collected by the lens 318 and outputs a detection signal according to the amount of light in the detected modulated light. In accordance with the detection signal from the light receiving element 305, the driving circuit 306 adjusts a driving voltage for the semiconductor laser 301 to regulate the amount of light radiated by the semiconductor laser 301.

The collector 303 collects the modulated light transmitted through the half mirror 314, at the optical disc 304. The configuration of the collector 303 will be described below. The optical disc 304 is formed of, for example, a phase change material. When light is input to the phase change material, the phase change material is heated to change the phase state thereof. The light collected by the collector 303 changes the phase status of the phase change material to record information in the optical disc. The plasmon modulator 101 modulates the light collected at the optical disc 304. Thus, the information is recorded in the optical disc 304.

Figure 22:
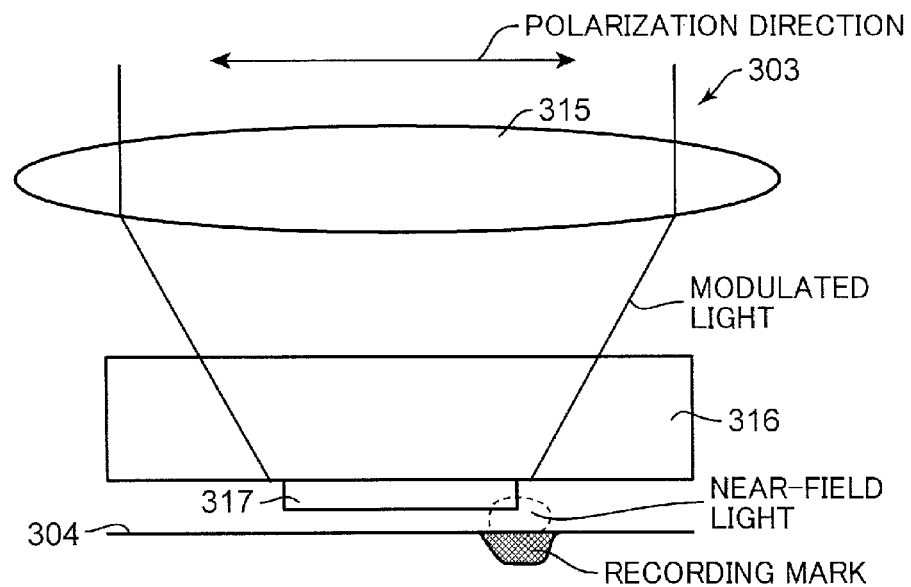
FIG. 22 is a side view of a collector shown in FIG. 21.
Figure 23:
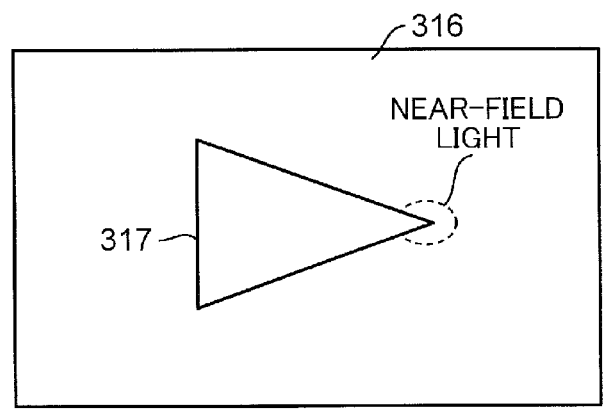
FIG. 23 is a bottom view of a collector shown in FIG. 21.

The collector 303 will be described. FIG. 22 is a side view of the collector 303 shown in FIG. 21. FIG. 23 is a bottom view of the collector 303 shown in FIG. 21. The collector 303 includes a lens 315, a substrate 316, and a metal antenna 317 formed on the substrate 316 to generate near-field light. The metal antenna 317 is formed of a material such as gold, silver, aluminum, or chromium which excites localized plasmon resonance with respect to modulated light. The metal antenna 317 has such a triangle plate structure as shown in FIG. 23.

The lens 315 collects the modulated light at the metal antenna 317. When the metal antenna 317 is irradiated with light, near-field light enhanced by localized plasmon resonance is generated near the top of the metal antenna 317. The metal antenna 317 uses the near-field light to locally heat the optical disc 304 to record the information in the optical disc 304.

As described above, the optical pickup according to Embodiment 3 includes the light modulator according to Embodiment 1, a light source that inputs light to the light modulator, and a collector that collects light modulated by the light modulator. The light modulator includes a waveguide through which guided light propagates, a metal layer formed adjacent to the waveguide, a conductive oxide layer having electrical conductivity and formed on a surface of the metal layer which is not adjacent to the waveguide, an insulating layer formed adjacent to the conductive oxide layer, and a modulation circuit that applies a voltage between the metal layer and one of the conductive oxide layer and the insulating layer. An interface at which the conductive oxide layer and the insulating layer are adjacent to each other is formed at a distance shorter than the wavelength of guided light in vacuum, from the surface of the metal layer which is not adjacent to the waveguide.

According to this configuration, when a voltage is applied to the metal layer, the conductive oxide layer, and the insulating layer, the electron density of the conductive oxide layer near the interface between the conductive oxide layer and the insulating layer changes to cause a significant change in the refractive index of the conductive oxide layer near the interface. Consequently, a phase matching condition between the guided light and SPP changes significantly depending on whether or not an applied voltage is present. This increases a difference in the amount of attenuation of the guided light caused by coupling to the SPP depending on whether or not an applied voltage is present. Because of the great difference in the amount of attenuation of the guided light depending on whether or not an applied voltage is present, an increased degree of modulation and a high modulation speed can be achieved even when the light modulator is small in length. Furthermore, since the degree of modulation of the modulated light can be increased even when the modulator is small in length, parasitic capacitances in the metal layer, the conductive oxide layer, and the insulating layer can be suppressed, and a light modulator can be implemented which can achieve a high modulation speed and a high degree of modulation. The transfer rate of the optical pickup can be increased by using the light modulator to modulate light to record information.

According to Embodiment 3, the metal antenna 317 is shaped like a triangle plate, but Embodiment 3 is not particularly limited to the triangle plate shape. The metal antenna 317 may have any common shape, for example, a disc shape or a bow tie shape, which induces localized plasmon resonance.

Furthermore, according to Embodiment 3, the collector 303 collects light by using near-field light from the metal antenna 317. However, the lens 315 may be used to collect light at the optical disc 304; this technique is adopted for conventional optical pickups.

Embodiment 4

Figure 24:
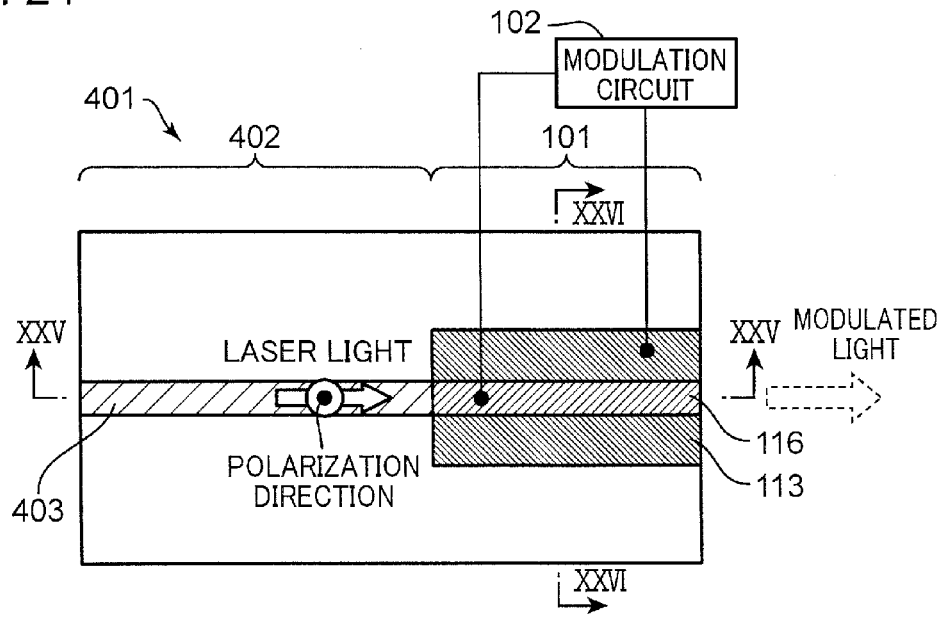
FIG. 24 is a top view of a light modulation module according to Embodiment 4 of the present invention.
Figure 25:
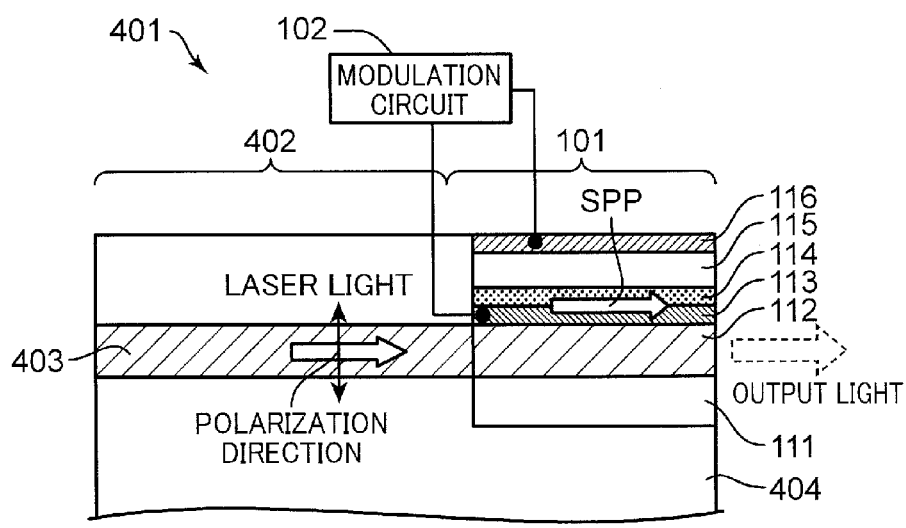
FIG. 25 is a cross-sectional view of the light modulation module shown in FIG. 24, the view being taken along line XXV-XXV in FIG. 24.
Figure 26:
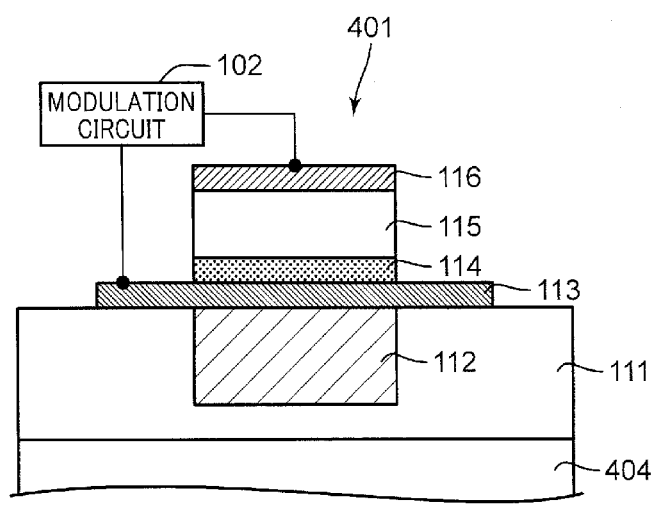
FIG. 26 is a cross-sectional view of the light modulation module shown in FIG. 24, the view being taken along line XXVI-XXVI in FIG. 24.

FIG. 24 to FIG. 26 are schematic diagrams of a light modulation module 401 according to Embodiment 4 of the present invention. Components in FIG. 24 to FIG. 26 which are the same as corresponding components in FIG. 1 to FIG. 3 are denoted by the same reference numerals and will not be described below.

FIG. 24 is a top view of the light modulation module 401 according to Embodiment 4 of the present invention. FIG. 25 is a cross-sectional view of the light modulation module 401 shown in FIG. 24, the view being taken along line XXV-XXV in FIG. 24. FIG. 26 is a cross-sectional view of the light modulation module 401 shown in FIG. 24, the view being taken along line XXVI-XXVI in FIG. 24.

In FIG. 24 to FIG. 26, the light modulation module 401 is a light modulation module that uses the plasmon modulator 101 according to Embodiment 1. As described above in Embodiment 1, the plasmon modulator 101 can output highly modulated light at a high speed, and thus drastically increase the rate at which the light modulation module 401 transfers information. The light modulation module 401 shown in FIG. 24 to FIG. 26 includes the plasmon modulator 101 and a semiconductor laser 402 that inputs light to the plasmon modulator 101. The light modulation module 401 modulates light from the light source (semiconductor laser 402) to transmit information.

The plasmon modulator 101 and the semiconductor laser 402 are produced on the same substrate 404. An output end of a waveguide 403 in the semiconductor laser 402 is coupled directly to an input end of a waveguide 112 in the plasmon modulator 101. Such a configuration can be implemented by etching a part of the semiconductor laser 402 away and producing a plasmon modulator 101 by the sputtering technique, the deposition technique, or the lithography technique. The semiconductor laser 402 and the plasmon modulator 101 are integrated together, enabling the light modulation module 401 to be miniaturized. Furthermore, the need for alignment of the optical axis is eliminated, allowing the output of modulated light to be stabilized. The semiconductor laser 402 may be, for example, a DFB (Distributed FeedBack) laser or a DBR (Distributed Bragg Reflector) laser. These lasers function without reflection of light from an end face of the waveguide and are thus suitable for integration.

Laser light output from the semiconductor laser 402 is input to the plasmon modulator 101 as guided light. The modulation circuit 102 applies a voltage to the plasmon modulator 101 in accordance with information to be transmitted, to modulate the guided light. The modulated light output from the plasmon modulator 101 is output to an optical fiber or the like for transmission.

As described above, the light modulation module according to Embodiment 4 includes the light modulator according to Embodiment 1 and a light source that inputs light to the light modulator. The light modulator includes a waveguide through which guided light propagates, a metal layer formed adjacent to the waveguide, a conductive oxide layer having electrical conductivity and formed on a surface of the metal layer which is not adjacent to the waveguide, an insulating layer formed adjacent to the conductive oxide layer, and a modulation circuit that applies a voltage between the metal layer and one of the conductive oxide layer and the insulating layer. An interface at which the conductive oxide layer and the insulating layer are adjacent to each other is formed at a distance shorter than the wavelength of guided light in vacuum, from the surface of the metal layer which is not adjacent to the waveguide.

According to this configuration, when a voltage is applied to the metal layer, the conductive oxide layer, and the insulating layer, the electron density of the conductive oxide layer near the interface between the conductive oxide layer and the insulating layer changes to cause a significant change in the refractive index of the conductive oxide layer near the interface. Consequently, a phase matching condition between the guided light and SPP changes significantly depending on whether or not an applied voltage is present. This increases a difference in the amount of attenuation of the guided light caused by coupling to the SPP depending on whether or not an applied voltage is present. Because of the great difference in the amount of attenuation of the guided light depending on whether or not an applied voltage is present, an increased degree of modulation and a high modulation speed can be achieved even when the light modulator is small in length. Furthermore, since the degree of modulation of the modulated light can be increased even when the modulator is small in length, parasitic capacitances generated by the metal layer, the conductive oxide layer, and the insulating layer can be suppressed, and a light modulator can be implemented which can achieve a high modulation speed and a high degree of modulation. When the light modulator is used to modulate light to transmit information, the light modulation module can be miniaturized and the transfer rate of the light modulation module can be increased.

Furthermore, in the light modulation module 401 according to Embodiment 4, the semiconductor laser 402, which is a light source, and the plasmon modulator 101 are arranged on the same substrate. This enables the light modulation module 401 to be miniaturized. Moreover, the need for alignment of the semiconductor laser 402 and the plasmon modulator 101 is eliminated, allowing light from the semiconductor laser 402 to be efficiently and stably input to the plasmon modulator 101.

Figure 27:
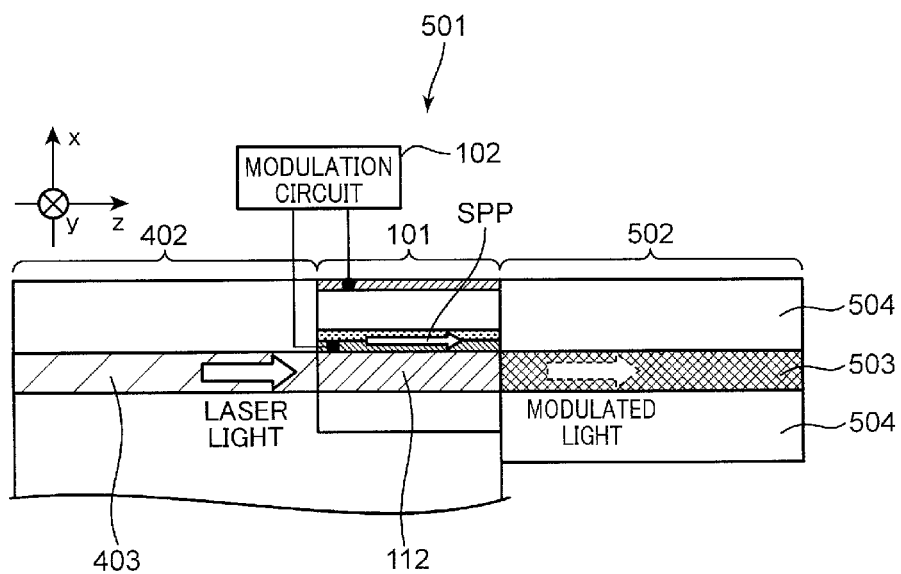
FIG. 27 is a cross-sectional view, in the width direction of a waveguide, of a light modulation module according to a first variation of Embodiment 4 of the present invention.

FIG. 27 is a cross-sectional view, in the width direction of the waveguide, of a light modulation module 501 according to a first variation of Embodiment 4 of the present invention. As shown in FIG. 27, the light modulation module 501 may be configured such that a waveguide 503 in an optical fiber 502 is coupled directly to an output end of a waveguide 112 in the plasmon modulator 101.

The light modulation module 501 shown in FIG. 27 includes the plasmon modulator 101 according to Embodiment 1, a semiconductor laser 402, and the optical fiber 502. The optical fiber 502 includes the waveguide 503 and a clad 504 covering a periphery of the waveguide 503. The output end of the waveguide 112 in the plasmon modulator 101 is coupled directly to an input end of the waveguide 503 in the optical fiber 502.

Figure 28:
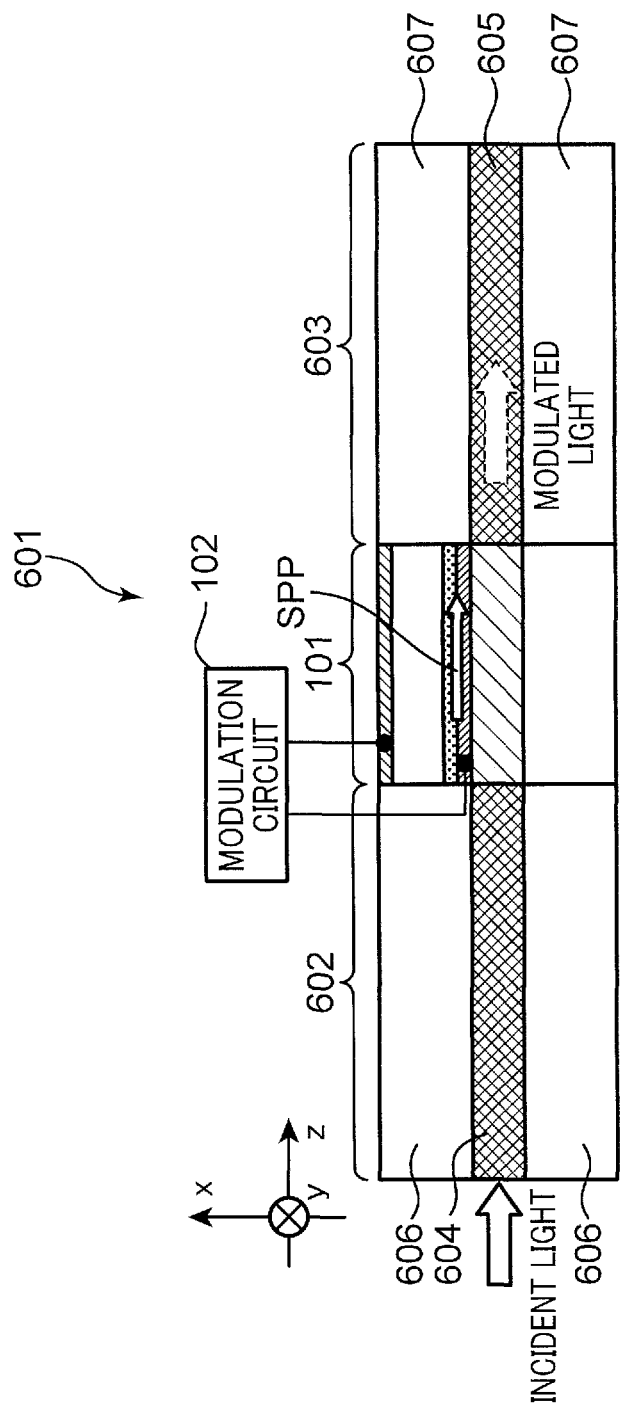
FIG. 28 is a cross-sectional view, in the width direction of the waveguide, of a light modulation module according to a second variation of Embodiment 4 of the present invention.

FIG. 28 is a cross-sectional view, in the width direction of the waveguide, of a light modulation module 601 according to a second variation of Embodiment 4 of the present invention. As shown in FIG. 28, in the light modulation module 601, a waveguide 604 in a first optical fiber 602 may be coupled directly to the input end of the waveguide 112 in the plasmon modulator 101, and a waveguide 605 in a second optical fiber 603 may be coupled directly to the output end of the waveguide 112 in the plasmon modulator 101. Light from a light source provided separately from the light modulation module 601 is input to the plasmon modulator 101 using the first optical fiber 602. Modulated light from the plasmon modulator 101 is output to the second optical fiber 603.

The light modulation module 601 shown in FIG. 27 includes the plasmon modulator 101 according to Embodiment 1, the first optical fiber 602, and the second optical fiber 603. The first optical fiber 602 includes the waveguide 604 and a clad 606 covering a periphery of the waveguide 604. The second optical fiber 603 includes the waveguide 605 and a clad 607 that covers a periphery of the waveguide 605. The input end of the waveguide 112 in the plasmon modulator 101 is coupled directly to an output end of the waveguide 604 in the first optical fiber 602. Furthermore, the output end of the waveguide 112 in the plasmon modulator 101 is coupled directly to an input end of the waveguide 605 in the second optical fiber 603.

Embodiment 5

Now, an optical communication system according to Embodiment 5 of the present invention will be described.

Figure 29:
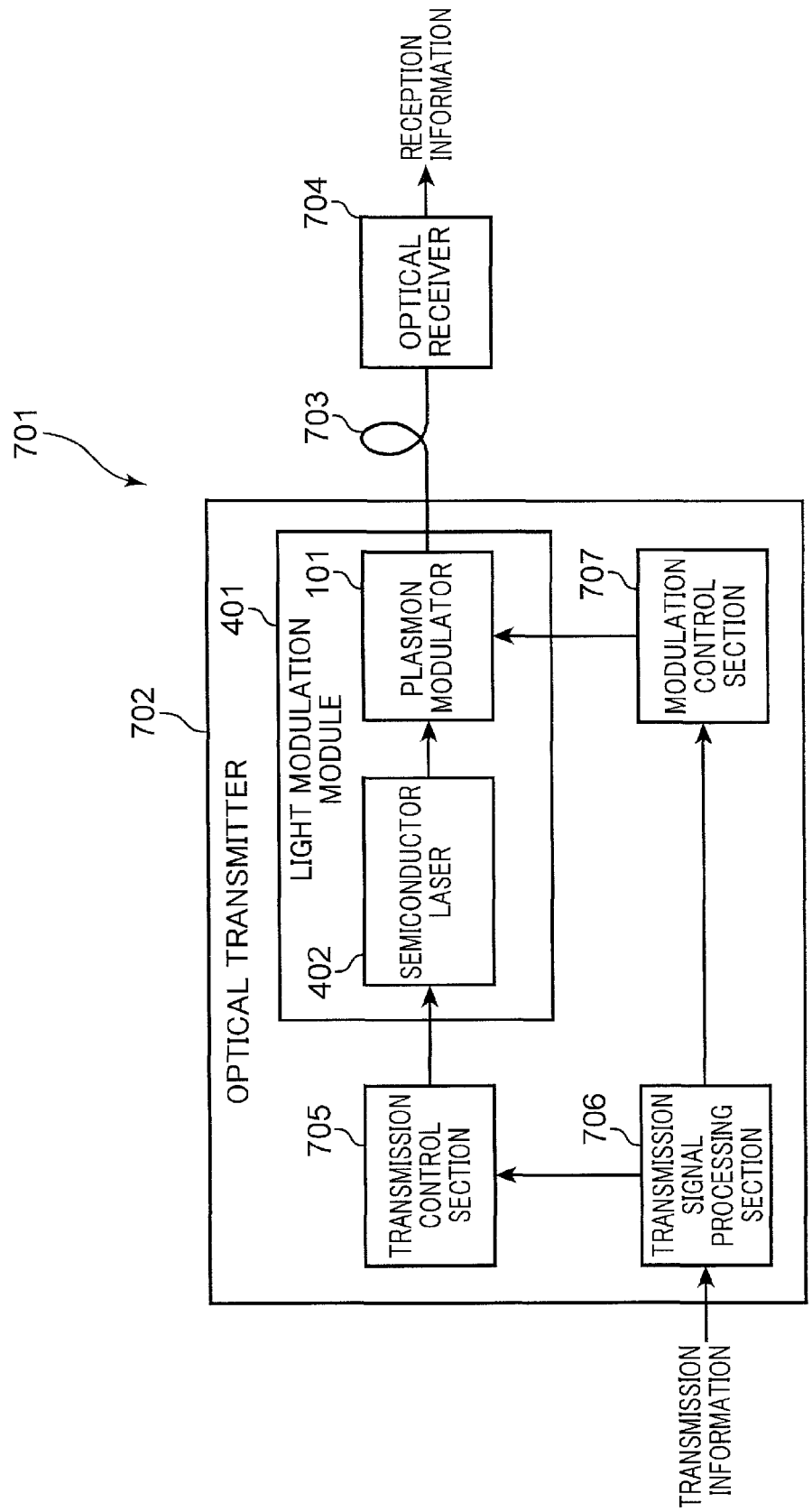
FIG. 29 is a block diagram showing a general configuration of an optical communication system according to Embodiment 5 of the present invention.
Figure 30:
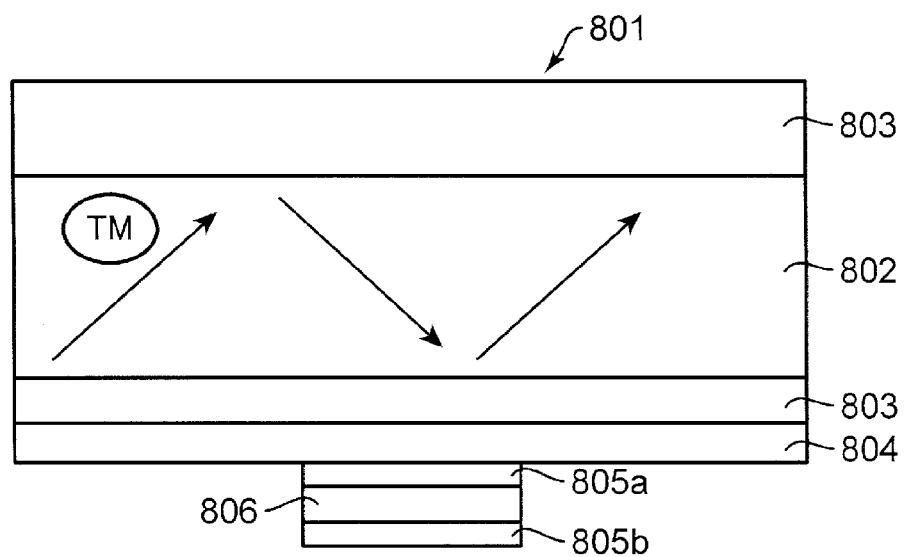
FIG. 30 is a cross-sectional view of a conventional plasmon modulator.

FIG. 29 is a block diagram showing a general configuration of the optical communication system according to Embodiment 5 of the present invention. Components in Embodiment 5 which are the same as corresponding components in Embodiments 1 to 4 are denoted by the same reference numerals and will not be described below.

An optical communication system 701 shown in FIG. 29 includes an optical transmitter 702, an optical transmission line 703, and an optical receiver 704. The optical transmitter 702 outputs modulated light in accordance with transmission information. The modulated light output from the optical transmitter 702 is input to the optical receiver 704 via the optical transmission line 703.

The optical transmitter 702 includes the light modulation module 401 according to Embodiment 4, a transmission control section 705, a transmission signal processing section 706, and a modulation control section 707.

The transmission signal processing section 706 receives transmission information that is information to be transmitted. Upon receiving the transmission information, the transmission signal processing section 706 notifies the transmission control section 705 that the transmission signal processing section 706 is to transmit data, generates a modulated signal based on the transmission information, and outputs the generated modulated signal to the modulation control section 707. The transmission control section 705 controls a semiconductor laser 402 so that the semiconductor laser 402 outputs light. Transmission light output from the semiconductor laser 402 is guided to a plasmon modulator 101.

Based on the received modulated signal, the modulation control section 707 controls a modulation circuit 102 in the plasmon modulator 101. The plasmon modulator 101 modulates guided light passing through the waveguide 112, in accordance with the transmission information, to output modulated light. The output modulated light is input to an optical transmission line 703.

The optical transmission line 703 is formed of, for example, an optical fiber to transmit the modulated light output from the optical transmitter 702 to the optical receiver 704.

The optical receiver 704 carries out photoelectric conversion on the modulated light transmitted through the optical transmission line 703 to detect an electric signal. The optical receiver 704 demodulates the detected electric signal to generate reception information. The optical receiver 704 outputs the generated reception information.

The specific embodiments mainly include the invention configured as described below.

A light modulator according to an aspect of the present invention includes a waveguide through which guided light propagates, a metal layer formed adjacent to the waveguide, a conductive oxide layer having electrical conductivity and formed on a surface of the metal layer which is not adjacent to the waveguide, an insulating layer formed adjacent to the conductive oxide layer, and a modulation circuit that applies a voltage between the metal layer and one of the conductive oxide layer and the insulating layer. An interface at which the conductive oxide layer and the insulating layer are adjacent to each other is formed at a distance shorter than the wavelength of the guided light in vacuum, from the surface of the metal layer which is not adjacent to the waveguide.

According to this configuration, the interface at which the conductive oxide layer and the insulating layer are adjacent to each other is formed at the distance shorter than the wavelength of the guided light in vacuum, from the surface of the metal layer which is not adjacent to the waveguide.

Thus, when a voltage is applied to the metal layer, the conductive oxide layer, and the insulating layer, the electron density of the conductive oxide layer near the interface between the conductive oxide layer and the insulating layer changes to cause a significant change in the refractive index of the conductive oxide layer near the interface. Consequently, a phase matching condition between the guided light and SPP changes significantly depending on whether or not an applied voltage is present. This increases a difference in the amount of attenuation of the guided light caused by coupling to the SPP depending on whether or not an applied voltage is present. Because of the great difference in the amount of attenuation of the guided light depending on whether or not an applied voltage is present, an increased degree of modulation and a high modulation speed can be achieved even when the light modulator is small in length.

Furthermore, in the light modulator, preferably, the conductive oxide layer is formed on the metal layer, and the insulating layer is formed on the conductive oxide layer, and the light modulator further includes a conductive layer formed on the insulating layer and functioning as an electrode to apply a voltage to the insulating layer.

According to this configuration, the conductive layer formed on the insulating layer functions as an electrode to apply a voltage to the insulating layer. This enables an increase in the thickness of the insulating layer to allow parasitic capacitances generated by the conductive layer and the metal layer to be suppressed. Therefore, light modulation can be carried out at high speed.

Furthermore, in the light modulator, preferably, the insulating layer is formed on the metal layer, and the conductive oxide layer is formed on the insulating layer.

According to the configuration, the insulating layer is formed on the metal layer, and the conductive oxide layer is formed on the insulating layer. This eliminates the need to reduce the thickness of the conductive oxide layer, allowing the light modulator to be easily produced.

Furthermore, in the light modulator, preferably, the conductive oxide layer functions as an electrode to apply a voltage to the insulating layer.

According to this configuration, the conductive oxide layer functions as an electrode to apply a voltage to the insulating layer. This eliminates the need for a conductive layer, allowing the light modulator to be easily produced.

Furthermore, in the light modulator, preferably, the guided light has a wavelength equal to or larger than 500 nm and equal to or smaller than 800 nm in vacuum.

This configuration increases the amount of change in refractive index with respect to a change in the electron density of the conductive oxide layer, resulting in a high degree of modulation.

Furthermore, in the light modulator, preferably, the guided light is linearly polarized light, and the main polarization direction of the guided light is perpendicular to the metal layer.

According to this configuration, the guided light is linearly polarized light, and the main polarization direction of the guided light is perpendicular to the metal layer. Thus, the guided light and the SPP can be efficiently coupled together, resulting in a high degree of modulation.

Furthermore, in the light modulator, preferably, the waveguide includes a slab waveguide, and the light modulator further includes a tapered waveguide connected to the slab waveguide and having a width gradually decreasing in the propagating direction of the guided light.

According to this configuration, the waveguide includes the slab waveguide, allowing light to be easily input to the waveguide. Additionally, a surface of the metal layer which contacts the slab waveguide is large in area, thus allowing the guided light to be absorbed dispersively over a wide area. Thus, the adverse effect of heat generated by the metal layer can be suppressed. Moreover, the tapered waveguide allows output light modulated by the light modulator to be efficiently coupled to an optical fiber or the like.

Furthermore, in the light modulator, preferably, the metal layer is larger than the waveguide in width.

According to this configuration, the metal layer is larger than the waveguide in width. This allows efficient radiation of heat generated by the energy of the guided light absorbed by the metal layer as a result of coupling to the SPP.

Furthermore, in the light modulator, preferably, each of the metal layer, the conductive oxide layer, and the insulating layer has a smaller length in a propagating direction of the guided light than a length of the waveguide in the propagating direction of the guided light.

According to this configuration, each of the metal layer, the conductive oxide layer, and the insulating layer is smaller than the waveguide in the length in the propagating direction of the guided light. This facilitates handling of the light modulator.

An optical pickup according to another aspect of the present invention includes any of the light modulators described above, a light source that inputs light to the light modulator, and a collector that collects the light modulated by the light modulator. This configuration allows the light modulator to be applied to the optical pickup.

A light modulation module according to another aspect of the present invention includes any of the light modulators described above and a light source that inputs light to the light modulator. This configuration allows the light modulator to be applied to the light modulation module.

The specific embodiments and examples disclosed in Description of Embodiments are intended in every respect to clarify the technical contents of the present invention. The present invention should not be narrowly interpreted by being limited to the specific examples. Various changes may be made to the embodiments and examples within the spirits of the present invention and the scope of the claims.

INDUSTRIAL APPLICABILITY

The light modulator according to the present invention can achieve an increased degree of modulation and a high modulation speed even when the light modulator is small in length. Thus, the light modulator according to the present invention is useful for a light modulator that modulates light and as a light modulator for optical communication or a light modulation module for optical communication.

Furthermore, the light modulator according to the present invention is applicable to an optical pickup that needs a high transfer rate. Such an optical pickup can be used for many applications such as an optical disc player, an optical disc recorder, a computer, and a data server.

The invention claimed is:
1. A light modulator comprising:
a waveguide through which guided light propagates;
a metal layer formed adjacent to the waveguide;
a conductive oxide layer having electrical conductivity and formed on a surface of the metal layer which is not adjacent to the waveguide;
an insulating layer formed adjacent to the conductive oxide layer; and
a modulation circuit that applies a voltage between the metal layer and one of the conductive oxide layer and the insulating layer,
wherein an interface at which the conductive oxide layer and the insulating layer are adjacent to each other is formed at a distance shorter than a wavelength of the guided light in vacuum, from the surface of the metal layer which is not adjacent to the waveguide.

2. The light modulator according to claim 1, wherein the conductive oxide layer is formed on the metal layer,
the insulating layer is formed on the conductive oxide layer, and
the light modulator further comprises a conductive layer formed on the insulating layer and functioning as an electrode to apply a voltage to the insulating layer.

3. The light modulator according to claim 1, wherein the insulating layer is formed on the metal layer, and
the conductive oxide layer is formed on the insulating layer.

4. The light modulator according to claim 3, wherein the conductive oxide layer functions as an electrode to apply a voltage to the insulating layer.

5. The light modulator according to claim 1, wherein the guided light has a wavelength equal to or larger than 500 nm and equal to or smaller than 800 nm in vacuum.

6. The light modulator according to claim 1, wherein the guided light is linearly polarized light, and
a main polarization direction of the guided light is perpendicular to the metal layer.

7. The light modulator according to claim 1, wherein the waveguide includes a slab waveguide, and
the light modulator further comprises a tapered waveguide connected to the slab waveguide and having a width gradually decreasing in the propagating direction of the guided light.

8. The light modulator according to claim 1, wherein the metal layer is larger than the waveguide in width.

9. The light modulator according to claim 1, wherein each of the metal layer, the conductive oxide layer, and the insulating layer has a smaller length in a propagating direction of the guided light than a length of the waveguide in the propagating direction of the guided light.

10. An optical pickup comprising:
the light modulator according to claim 1;
a light source that inputs light to the light modulator; and
a collector that collects the light modulated by the light modulator.

11. A light modulation module comprising:
the light modulator according to claim 1; and
a light source that inputs light to the light modulator.

* * * * *